(12) United States Patent
Derham et al.

(10) Patent No.: US 9,176,223 B2
(45) Date of Patent: Nov. 3, 2015

(54) OBJECT DETECTION METHOD, DEVICE AND SYSTEM

(75) Inventors: Thomas Derham, Tokyo (JP); Patrice Coupe, Paris (FR)

(73) Assignee: FRANCE TELECOM, Paris (FR)

(*) Notice: Subject to any disclaimer, the term of this patent is extended or adjusted under 35 U.S.C. 154(b) by 361 days.

(21) Appl. No.: 13/822,912

(22) PCT Filed: Sep. 12, 2011

(86) PCT No.: PCT/EP2011/065767
§ 371 (c)(1),
(2), (4) Date: Mar. 13, 2013

(87) PCT Pub. No.: WO2012/034977
PCT Pub. Date: Mar. 22, 2012

(65) Prior Publication Data
US 2013/0176161 A1 Jul. 11, 2013

(30) Foreign Application Priority Data
Sep. 13, 2010 (EP) .................................... 10305980

(51) Int. Cl.
*G01S 13/04* (2006.01)
*G01S 7/36* (2006.01)
*G01S 7/41* (2006.01)

(52) U.S. Cl.
CPC . *G01S 13/04* (2013.01); *G01S 7/36* (2013.01); *G01S 7/412* (2013.01)

(58) Field of Classification Search
CPC ............ G01S 13/04; G01S 7/36; G01S 7/412
USPC ......... 342/27, 28, 57, 99, 107, 113, 115, 125, 342/139, 140, 146, 147
See application file for complete search history.

(56) References Cited

U.S. PATENT DOCUMENTS 6,700,528 B2 3/2004 Williams et al.
8,451,741 B2 * 5/2013 Enstrom et al. ............... 370/252

(Continued)

FOREIGN PATENT DOCUMENTS

EP 2428814 A1 * 3/2012
EP 2680532 A1 * 1/2014

(Continued)

OTHER PUBLICATIONS

European Search Report and Written Opinion dated Mar. 22, 2011 for corresponding European Patent Application No. 10305980.4 filed Sep. 13, 2010, 6 pages.

(Continued)

*Primary Examiner* — John B Sotomayor
(74) *Attorney, Agent, or Firm* — David D. Brush; Westman, Champlin & Koehler, P.A.

(57) ABSTRACT

A method and apparatus are provided for detecting an object to be detected. The object is associated with a profile, wherein the profile characterizes the reflection of a signal on the object. The method includes, for a device in a telecommunication network, the acts of selecting a first profile corresponding to a first object to be detected; requesting, based on the first profile, a resource allocation to the communication network; receiving the resource allocation from the communication network; transmitting a signal in the direction of a second object using the allocated resource; receiving a reflected signal, corresponding to the reflection of the transmitted signal on the second object; computing a second profile using the received reflected signal; and indicating the detection of the first object to be detected when the second profile matches the first profile.

15 Claims, 10 Drawing Sheets

(56) References Cited

U.S. PATENT DOCUMENTS

| | | | |
|---|---|---|---|
| 2004/0214598 A1 | 10/2004 | Parameswaran Rajamma | |
| 2005/0242984 A1 | 11/2005 | Waters | |
| 2008/0239976 A1* | 10/2008 | Altman | 370/252 |
| 2009/0215488 A1 | 8/2009 | Causey et al. | |

FOREIGN PATENT DOCUMENTS

| | | | |
|---|---|---|---|
| WO | 2007136610 A2 | 11/2007 |
| WO | 2008058770 A1 | 5/2008 |

OTHER PUBLICATIONS

V. Lubecke et al., "A Compact Low-Cost Add-On Module for Doppler Radar Sensing of Vital Signs using a Wireless Communications Terminal", 2002.

O. Boric-Lubecke et al., "Wireless IC Doppler Radars for Sensing of Heart and Respiration Activity", 2003.

International Search Report and Written Opinion dated Nov. 10, 2011 for corresponding International Application No. PCT/EP2011/065767, filed Sep. 12, 2011.

* cited by examiner

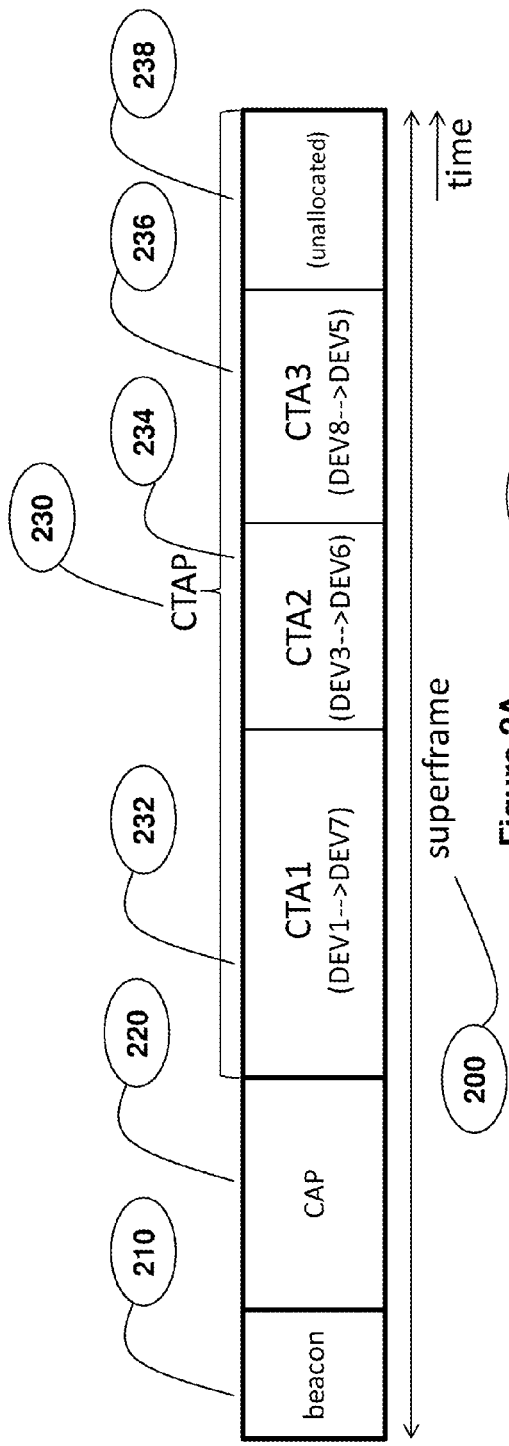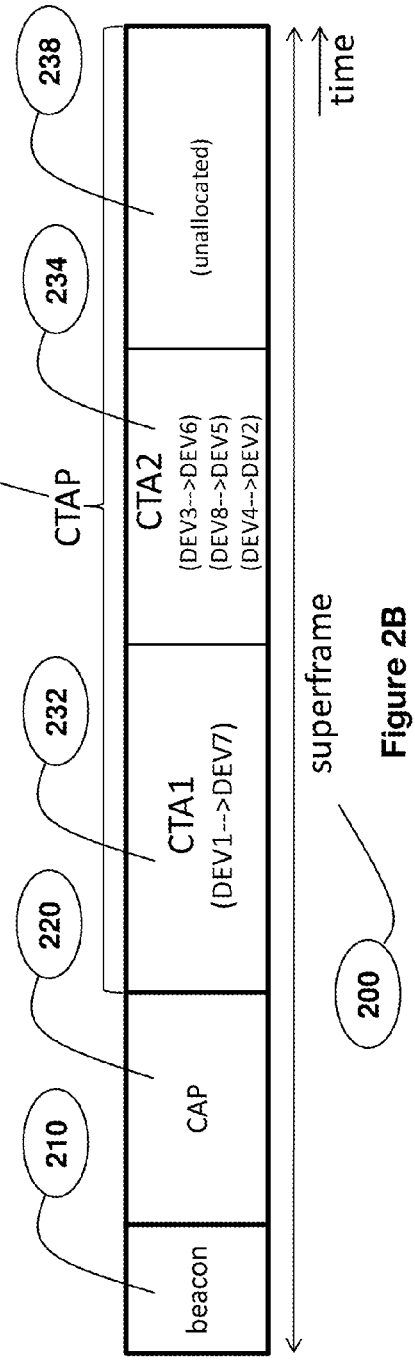
Figure 2A
Figure 2B

OBJECT DETECTION METHOD, DEVICE AND SYSTEM

CROSS-REFERENCE TO RELATED APPLICATION

This application is a Section 371 National Stage Application of International Application No. PCT/EP2011/065767, filed Sep. 12, 2011, which is incorporated by reference in its entirety and published as WO 2012/034977 on Mar. 22, 2012, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to telecommunication services and more specifically to object detection services.

BACKGROUND OF THE DISCLOSURE

Wireless telecommunication networks are designed for convenient data exchange between devices. Communication between one device and another in the network occurs across a wireless link, where the transmitting device or transmitter emits certain electromagnetic signals from its antenna which propagate over the wireless link and are picked up by the antenna of the receiving device or receiver. Communication devices may be used nowadays to locate or detect an object such as for instance a shop, a car, a monument, a person etc. . . . In some situations, communication devices may be used to detect the position of an object such as assisted car-park devices. Such devices use signals reflecting on the obstacle to detect it or determine the distance between the obstacle and the parking car. In the case of emergency situations such as major earthquakes or snow avalanches, persons may be trapped inside buildings or under rubble or snow and unable to escape. Clearly, time is of the essence in rescuing these persons since they may have serious injuries, lack of air, food and water, be exposed to extreme weather conditions and subject to further dangers such as falling rubble, fires, snow and so on. Conventionally, rescue services attempt to find these persons using infra-red cameras to detect body heat. However, this requires the use of trained personnel with expensive professional equipment in the case of human body detection, which is not readily available in most locations at short notice. Similarly, an embedded device that is dedicated to obstacle detection is required for instance for car-park assistance. In these cases, the device is not part of a public telecommunication network and a telecommunication network device such as a user equipment may not be commonly used to detect an object.

An existing solution described in "A Compact Low-Cost Add-On Module for Doppler Radar Sensing of Vital Signs using a Wireless Communications Terminal", V. Lubecke et al, 2002, proposes a passive free-standing module that can be used in combination with an arbitrary telecommunications device for micro-Doppler sensing (i.e. detection). The module uses the transmitted signals from the telecommunications device as an "illuminator of opportunity", and mixes both the direct signal and Doppler-shifted signal to produce the Doppler frequency. Communication of detected signals (i.e. detection of vital signs) is performed separately by the free-standing module. Drawbacks of this solution are that, as the module is dedicated and independent from the device, the module is not integrated in a telecommunication network nor embedded on a communication device. This solution prevents thus the user equipment to take advantage of the existing infrastructures and resources of a telecommunication network to perform the detection of a given object with a given profile.

Another existing solution described in "Wireless IC Doppler Radars for Sensing of Heart and Respiration Activity", O. Boric-Lubecke et al, 2003, proposes detection of heart and respiration activity with micro-Doppler using a sensor constructed from components designed for telecommunications devices rather than a custom radar system. However, in this solution, the specificity of the telecommunication system is not taken into account, such as in particular the resource allocation. This sensor solution cannot be adapted to a user equipment in a telecommunication network and prevents thus the user equipment to take advantage of the existing infrastructures and resources of a telecommunication network to perform the detection of a given object with a given profile.

Another existing solution described in U.S. Pat. No. 6,700,528 B2 "Motion Detection and Alerting System", C. Williams, 2004, proposes a motion detection device using Doppler comprising a low cost radar IC, battery, and separate mobile phone device for communications. Drawbacks are that the solution prevents the user equipment to take advantage of the existing infrastructures and resources of a telecommunication network to perform the detection of a given object with a given profile.

Another existing solution described in WIPO patent application WO 2007/136610 A2 "Determining Presence and/or Physiological Motion of One or More Subjects with Multiple Receiver Doppler Radar Systems", O. Boric-Lubecke et al, 2007, proposes the use of multiple radar receivers for motion detection using Doppler (this is well-known in the literature as multistatic radar). The novelty is mostly regarding a blind source separation (BSS) signal processing technique (e.g. for separation of Doppler signals from multiple persons) and demodulation techniques. This solution prevents thus the user equipment to take advantage of the existing infrastructures and resources of a telecommunication network to perform the detection of a given object with a given profile.

Today there is no solution to efficiently detect objects that allow using common devices in wireless telecommunication systems and thus improving the functionality of such wireless telecommunication systems.

Therefore, there is a need for a device, of which one or several might be present in an average home, office, vehicle or mountain environment, which is capable of independently detecting the presence of objects such as e.g. persons in its local vicinity and reporting this fact to a user or rescue services or other volunteers who then have the opportunity to save these persons as quickly as possible. Today there is a need for an object detection solution that can be easily implemented on the existing communication infrastructures.

SUMMARY

An exemplary embodiment of the invention proposes a method of detecting an object to be detected, said object being associated with a profile, said profile characterizing the reflection of a signal on the object, said method comprising, for a device in a telecommunication network, the acts of:

selecting a first profile corresponding to a first object to be detected, requesting, based on the first profile, a resource allocation to the communication network, receiving the resource allocation from the communication network, transmitting a signal in the direction of a second object using said allocated resource, receiving a reflected signal, corresponding to the reflection of the transmitted signal on the second object, computing a second profile using the received reflected signal, indicating the detection of the first object to be detected when the second profile matches the first profile.

An advantage of the method according to an embodiment of the invention is that a device may take advantage of the existing infrastructures and resources of a telecommunication network to perform the detection of a given object with a given profile by requesting a specific network resource in accordance with the profile of an object (e.g. to be detected). The resource from the network may be adapted by the telecommunication network to the device request. In other words, specific resources for detecting a specific profile are allocated to the device on request by the telecommunication network. The allocation resource is adapted according to the *kind of objects* (i.e. profile) selected on the device for detection the corresponding object.

An embodiment of the invention also proposes a method, wherein, in the act of requesting a resource allocation based on the first profile, the resource corresponds to a time slot at a defined time interval, said defined time interval being based on at least one attribute of the first profile. An advantage is that the resource allocation, and in particular the required time interval between time slots that corresponds to the detection of a given object, may be adapted or customized to the type of object (in particular, at least one attribute of said object to be detected).

An embodiment of the invention also proposes a method, wherein the act of computing the second profile is computed based on the Doppler effect of the received reflected signal on the second object. An advantage of using the Doppler effect is that the accurate detection of particular types of moving objects is possible. Another advantage is that the detection based on the Doppler effect is particularly suited for the use of the hardware of common devices (such as e.g. Wireless Personal Area Network (WPAN)/Wireless Local Area Network (WLAN) devices).

An embodiment of the invention also proposes a method, wherein the first profile comprises attributes characterizing the first object and wherein the second profile comprises attributes characterizing the second object, said attributes comprising at least one attribute of the group consisting of range, azimuth, elevation and velocity. An advantage of using the range, azimuth, elevation and velocity is that accurate detection of the position, movement and identity of objects is possible using these four attributes for detection.

An embodiment of the invention also proposes a method, the act of indicating further comprising comparing attributes of the first and second profile in order to decide of a match between the first and the second profile. An advantage of using attributes to compare the first and second profile is the accuracy as attributes may be compared one by one.

An embodiment of the invention also proposes a method, said method further comprising an act of obtaining a request for triggering the selection of the first profile. An advantage of obtaining a request is that the trigger for selecting a first profile is controlled.

An embodiment of the invention also proposes a method, wherein the act of selecting a first profile is performed automatically by the device. An advantage of selecting a first profile automatically is that no further action is required to trigger the selection, increasing therefore the speed and efficiency of the device in emergency situations.

An embodiment of the invention also proposes a method, wherein the act of indicating further comprises comparing the computed second profile with at least one profile of a set of first profiles, said set of profiles being accessible to the device. An advantage is that the computed second profile may be compared with one or a plurality of first profile(s) that may be accessed by the device such as e.g. stored in a database of profiles.

An embodiment of the invention also proposes a method, wherein the resource allocated for detection is allocated with a high priority among the resources allocated in the communication network. An advantage of allocating the resource with a high priority is that the speed and efficiency of the device increase, which may prove to be vital in emergency situations.

An embodiment of the invention also proposes a device for detecting an object to be detected, said object being associated with a profile, said profile characterizing reflection of a signal on the object, said device, in a telecommunication network, comprising:

a selection unit configured to select a first profile corresponding to a first object to be detected, a resource allocation request unit configured to request, based on the first profile, a resource allocation to the communication network, a resource allocation reception unit configured to receive the resource allocation from the communication network, a signal transmission unit configured to transmit a signal in the direction of a second object using said allocated resource, a signal reception unit configured to receive a reflected signal, corresponding to the reflection of the transmitted signal on the second object, a computing unit configured to compute a second profile using the received reflected signal, and an indication unit configured to indicate detection of the first object to be detected when the second profile matches the first profile.

An embodiment of the device proposes similar advantages to those of the method according to an embodiment of the invention. Moreover, an advantage of the method according to an embodiment of the invention is that, in addition to standard communications functionality, the device may be an existing communication device such as for example a mobile user equipment, using the same hardware as for communications to perform motion detection using electromagnetic waves. This makes the detection device to be low-cost and multi-functions in order to gain commercial acceptance and integration in every-day home, car, outdoors and office appliances. Another advantage of the device according to an embodiment of the invention is that the device may be any kind of wireless telecommunications device, such as e.g. Wi-Fi transceivers found in computers and video games machines, cellular devices (e.g. GSM, WCDMA, LTE, WiMax) etc. . . . . Appliances comprise mobile phones and portable computers; Bluetooth enabled appliances include mobile phones, headset, body-worn devices and accessories.

In addition a variety of new WLAN and WPAN (wireless personal area network) enabled appliances with very high throughput (Wireless HDMI, 802.15.3c, 802.11TGad) coming to market may also be used, including for example televisions, projectors, multimedia servers, audio devices and video recorders etc. . . .

An embodiment of the invention also proposes a system for detecting an object to be detected, said object being associated with a profile, said profile characterizing reflection of a signal on the object, said system comprising:
 a telecommunication network,
 an object to be detected, and
 a device comprising:
  a selection unit configured to select a first profile corresponding to a first object to be detected,
  a resource allocation request unit configured to request, based on the first profile, a resource allocation to the communication network,
  a resource allocation reception unit configured to receive the resource allocation from the communication network,
  a signal transmission unit configured to transmit a signal in the direction of a second object using said allocated resource,
  a signal reception unit configured to receive a reflected signal, corresponding to the reflection of the transmitted signal on the second object,
  a computing unit configured to compute a second profile using the received reflected signal, and
  an indication unit configured to indicate the detection of the first object to be detected when the second profile matches the first profile.

An advantage of an embodiment of the system is that the telecommunication network may be of any kind as long as the device may request specific resources adapted to the object detection (i.e. in accordance with the profile of the object). The system proposes similar advantages to those of the method and device according to an embodiment of the invention.

an embodiment of the invention also proposes a non-transitory computer-readable medium having computer-executable instructions to configure a computer system to perform a method of detecting an object to be detected, said object being associated with a profile, said profile characterizing reflection of a signal on the object, said instructions comprising, for a device in a telecommunication network:
 instructions that configure the computer system to select a first profile corresponding to a first object to be detected,
 instructions that configure the computer system to request, based on the first profile, a resource allocation to the communication network,
 instructions that configure the computer system to receive the resource allocation from the communication network,
 instructions that configure the computer system to transmit a signal from the device in the direction of a second object using said allocated resource,
 instructions that configure the computer system to receive a reflected signal, corresponding to the reflection of the transmitted signal on the second object,
 instructions that configure the computer system to compute a second profile using the received reflected signal, and
 instructions that configure the computer system to indicate detection of the first object to be detected when the second profile matches the first profile.

An embodiment of the readable computer program proposes similar advantages to those of the method according to an embodiment of the invention.

BRIEF DESCRIPTION OF THE DRAWINGS

Embodiments of the present invention will now be described solely by way of example and only with reference to the accompanying drawings, where like parts are provided with corresponding reference numerals, and in which:

FIG. 2A schematically illustrates a superframe according to an embodiment of the present invention;

FIG. 2B schematically illustrates a superframe according to an embodiment of the present invention;

DETAILED DESCRIPTION OF ILLUSTRATIVE EMBODIMENTS

The following are descriptions of exemplary embodiments that when taken in conjunction with the drawings will demonstrate the above noted features and advantages, and introduce further ones. In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims. Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method. Unless specified otherwise, the exemplary embodiment will be described hereafter in its application to a device of a wireless telecommunication network. In addition, it should be expressly understood that the drawings are included for illustrative purposes and do not represent the scope of the present system.

Figure 1A:
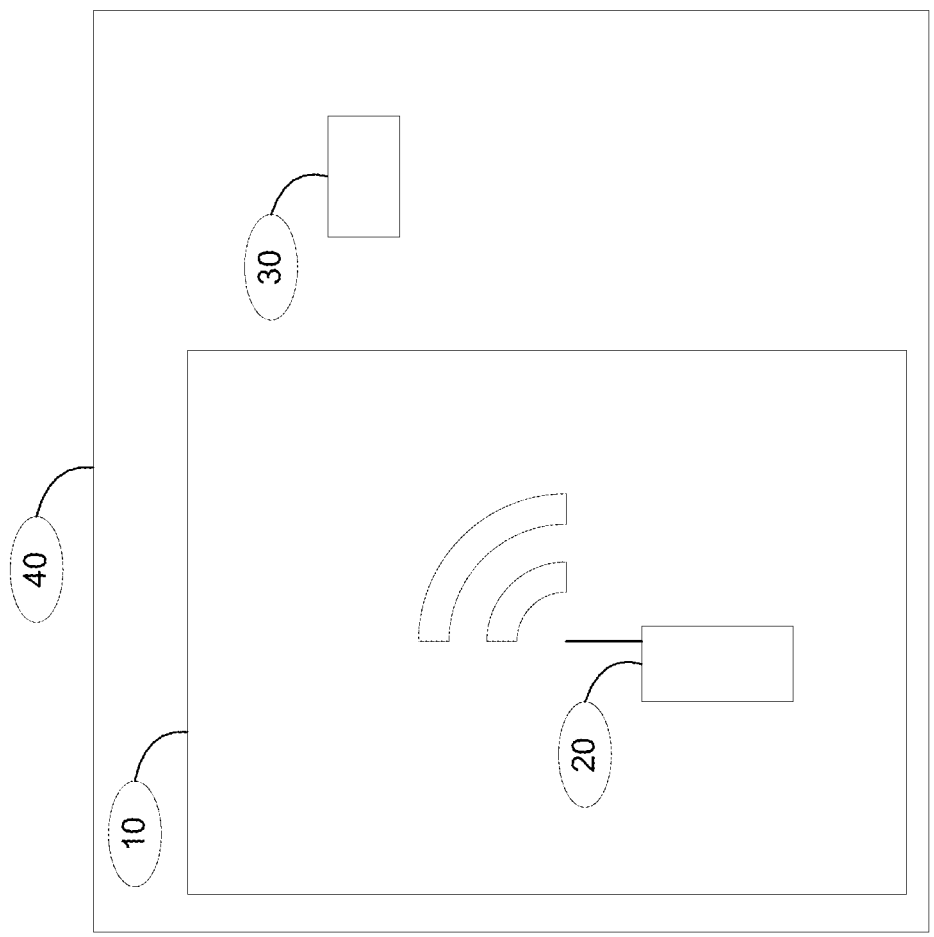
FIG. 1A schematically illustrates a system according to an embodiment of the present invention.

FIG. 1A describes an illustrative embodiment of the system according to an embodiment of the invention. A device 20 in a telecommunication network 10 allows detecting an object 30 in an environment 40. The device 20 may be for instance a wireless communication device. The wireless communication device may use one or more conventional standard protocols using microwave frequencies, such as for example, but not limited to, frequencies in the range 1-300 GHz. The wireless communication device may be capable of being embedded in conventional home and office appliances, such as for example televisions, video recorders, games machines, desktop, notebook and handheld computers, mobile phones, micro- and miniature devices, etc. . . . . The wireless communication device may contain a rechargeable battery, which is topped-up as and when the appliance is connected (directly or indirectly) to a source of main power. Different allocation schemes are defined depending on the type of telecommunication network. The telecommunication network 10 may be any network that may allocate resources that may be use in accordance with a profile of an object to be detected as described here under. For instance, it may be a Time Division Multiple Access (TDMA) telecommunication network (such as for instance a 2G or 3G telecommunication network) in which the allocated time slots may be used by a device to schedule object detection according to a given profile as described here under in reference to the method according to an embodiment of the invention. Wireless Personal Area Network (WPAN) and Wireless Local Area Network (WLAN) communication systems are designed for data exchange between devices over a typical range of up to 10 m (WPAN) or 250 m (WLAN), while cellular or Wireless Metropolitan Area Network (WMAN) systems allow data exchange over ranges up to several kilometers. Recent technical developments in these systems have increased data throughput and reliability by the use of multiple antennas at the transmitter and receiver (MIMO) and wider bandwidths. Most current WPAN, WLAN and WMAN systems operate in the lower microwave frequency band (2-6 GHz). However, WPAN systems with very wide channel bandwidth of at least 500 MHz have recently been standardized in IEEE 802.15.4a for frequency bands up to 10 GHz, and in both IEEE 802.15.3c and ECMA-387 for the 57-66 GHz band. Further, IEEE 802.11 TGad is currently working on developing a WLAN standard for the 57-66 GHz band. WPAN, WLAN and WMAN devices contain hardware such as baseband processors, RF signal chains (modulators, filters, amplifiers, etc) and antennas, which are also found in radar devices. In fact, due to this commonality, it is apparent that such devices could, in principle, be used to implement radar detection functionalities in addition to their communication functionalities. Devices that support very wide channel bandwidths would be particularly well suited to such applications, since radar range resolution is strongly influenced by system bandwidth. In addition, devices that support signals in high frequency bands (e.g. 57-66 GHz band) may also be particularly well suited, since high sensitivity to object motion (using the Doppler effect) is implied by the small RF wavelength, and they typically comprise adaptive antennas with directive beams that give rise to angular resolution capability. Such radar functionality may allow detection of the environment in the local vicinity of the device, and a radar image may be formed. From this image, the three-dimensional position of objects in the local environment may be estimated, their velocity or vibration rate may be estimated, and/or the objects may be classified or identified.

Such functionality may be used in various applications, such as security detection, collision avoidance, detection of human life in emergencies, smart environment detection and other monitoring applications. When such a device performs radar detection, it shall transmit specific signals, and receive reflections of those signals from any objects in the surrounding region, then processing the received signals to form a radar image of the surrounding region. It will be well-known to those skilled in the art that the term "radar image" does not necessarily imply a two-dimensional visible image, but instead may be a data construct that describes the apparent reflectivity of the surrounding region in one or more dimensions which may include range, azimuth angle, elevation angle, and radial velocity.

Figure 1B:
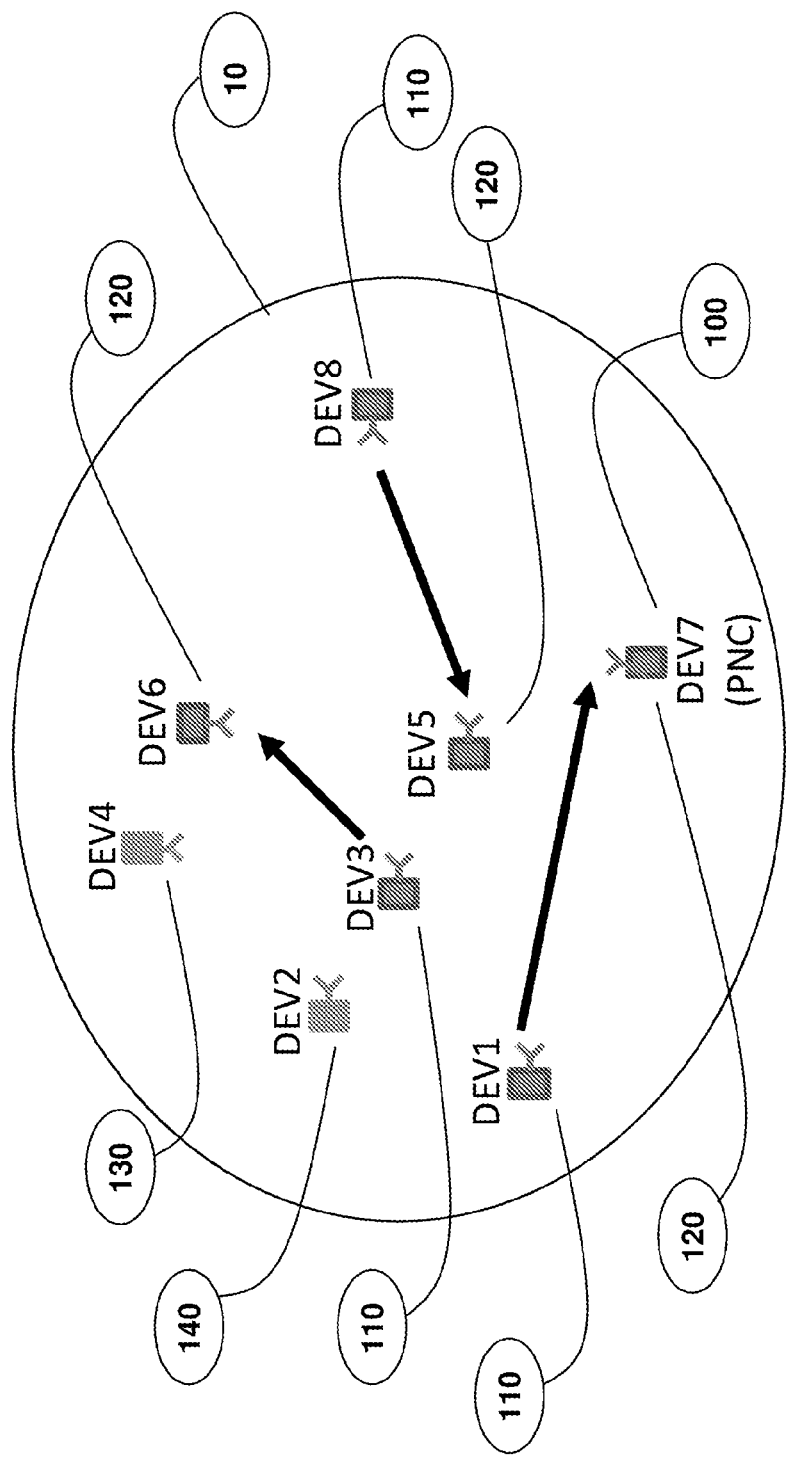
FIG. 1B schematically illustrates a network according to an embodiment of the present invention.

Recently, millimetre wave systems operating in the 60 GHz frequency band have been specified to provide data rates of several Gigabits per second (Gbps) over short range (typically up to 10 m). The very wide bandwidth available in the 60 GHz band (7 GHz in most major jurisdictions) means such wireless networks are capable of providing very high data throughput up to several Gigabits per second (Gbps) to support applications such as for instance high-definition video streaming and high-speed bulk data download/upload between devices. Furthermore, one characteristic of 60 GHz wireless networks is that, due to the small RF wavelength (approximately 5 mm), high antenna gain is required to reach the required Signal to Noise Ratio (SNR) over the wide bandwidth with limited transmitter power (typical maximum 10 dBm). Therefore, devices in the network may employ directional antennas, and the antenna beams may be adaptively adjusted to maximize the link quality between each pair of devices. Directional antennas may in principle be used to allow spatial reuse—that is, the directionality of the antennas may reduce the mutual interference between multiple pairs of devices in the same network so that they may be co-scheduled in order to transmit simultaneously on the same channel (i.e. in the same frequency band and at the same time). In such networks, device scheduling and resource allocation are performed by a network coordinating device or network coordinator. The network coordinator is part of the network and may also be scheduled for communicating in a pair with another device either as a receiver or as a transmitter. When a device wants to join such a wireless telecommunication network, it sends a request to the network coordinator, which will further schedule the device for communicating. The system and device according to an embodiment of the present invention will be described here under in reference to WPAN and WLAN networks operating in the 60 GHz band that are based on standards such as for example Institute of Electrical and Electronics Engineers (IEEE) 802.15.3c, 802.11.ad or ECMA-387 ad-hoc networks, due to the very wide bandwidth and high carrier frequency which leads to more accurate position and motion detection. This is in no way limiting of the scope of the present invention as the invention may be implemented in any communication network comprising resource that may be requested or allocated in accordance with a profile of an object to be detected as described here under. FIG. 1B describes an illustrative embodiment of the system according to the invention, wherein the system comprises a telecommunication network 10 which is an ad-hoc telecommunication network in which at least one device (DEV) may communicate. In this illustrative embodiment, the telecommunication network 10 is an ad-hoc telecommunication network in which a network coordinating device or network coordinator 100 allows schedule and/or allocate resources to at least one device. The advantage of an ad-hoc telecommunication is that in case of a major disaster such as for example an earthquake, if the telecommunication network infrastructures are down, an ad-hoc telecommunication network (such as e.g. a IEEE 802.15.3c standard telecommunication network described here under) allows one device acting as network coordinator to allocate resources to communicate to other devices or in particular to communicate in order to detect an object to be detected according to method according to an embodiment of the invention described here under. In such an ad-hoc telecommunication network, devices may communicate in pairs, wherein, in each pair, a transmitting device or transmitter transmits 110 data to (or communicates with) a receiving device or receiver 120. A device 130 and a device 140 may wish to join the telecommunication network 10 and be scheduled in order for the device 130 to transmit data to device 140. One device in the telecommunication network 10 acts as a network coordinator 100 (such as e.g. a PicoNet Coordinator (PNC)) and schedules devices for pair communication (i.e. communication within a pair between the transmitter and the receiver of said pair). In order to join the telecommunication network 10, devices 130 or 140 may send a request to join the network in order for the pair of them to be scheduled and optionally further be allocated resources (e.g. time slot(s)) by the network coordinator 100. Scheduled pairs of devices and pairs that have made a request for scheduling but are waiting to be scheduled are pairs with active links.

In the system and method according to an embodiment of the invention, each device 20 in the telecommunication network 10 may be a transmitting device 110 that uses its allocated resources to emit signals toward an object and a receiving device 120 that receive signals reflected on an object in order to further detect said object as described in the method according to an embodiment of the invention here under.

In an illustrative embodiment of the system according to an embodiment of the invention, the telecommunication network 10 may also be for example a telecommunication network defined according to the IEEE 802.11.TGad standard. In this standard, the telecommunication network 10 for which spatial reuse may apply is known as a Personal Basic Service Set (PBSS) (or Independent Basic Service Set (IBSS)), the devices are known as Stations (STAB), and the coordinator may be known as a PCP (PBSS Control Point).

As mentioned here above, the system, device and method according to an embodiment of the invention will now be described, without any limitation on the scope of the present invention, in reference to a telecommunication network defined according to the IEEE 802.15.3c standard. In the IEEE 802.15.3c standard, the telecommunication network 10 is known as a piconet, the devices are known as DEVs, and one device in the network is assigned as the network coordinator 100 known as PicoNet Coordinator (PNC)—this terminology is used in the description below. However, it will be appreciated by those skilled in the art that the scope of the current invention is not limited to a particular standard, protocol or terminology, and may be applied to any wireless communications network with directional antennas in any band of frequency. When pairs of devices have been scheduled, they may further be allocated resources (e.g. time-slot(s)) by the network coordinator 100. They may (but are not obliged to) use these said allocated resources to transmit and receive data (i.e. communicate) to the corresponding (or paired) device in the pair. As described in FIG. 1B as an example, transmitting devices DEV1, DEV3 and DEV5 communicate in pairs (i.e. are paired) respectively with receiving devices DEV7, DEV6 and DEV5, while devices DEV4 and DEV2 have not been scheduled by the network coordinator 100 yet, but wish to be able to communicate from transmitting device DEV4 to receiving device DEV2. As transmitters DEV1, DEV3 and DEV8 communicate in pairs respectively with receivers DEV7, DEV6 and DEV5, each receiver 120 in each pair of devices may receive signals transmitted by the transmitters 110, i.e. from the paired transmitting device and from the transmitters of other pairs of devices. For example, receiver DEV5 may receive signals from transmitters DEV1, DEV3 and DEV8. Moreover, DEV5 may also receive signals from DEV4, which may transmit data for the purpose of joining the telecommunication network 10 or during an antenna or beamforming training procedure (described here under), i.e. prior to communicating with DEV2.

Figure 1C:
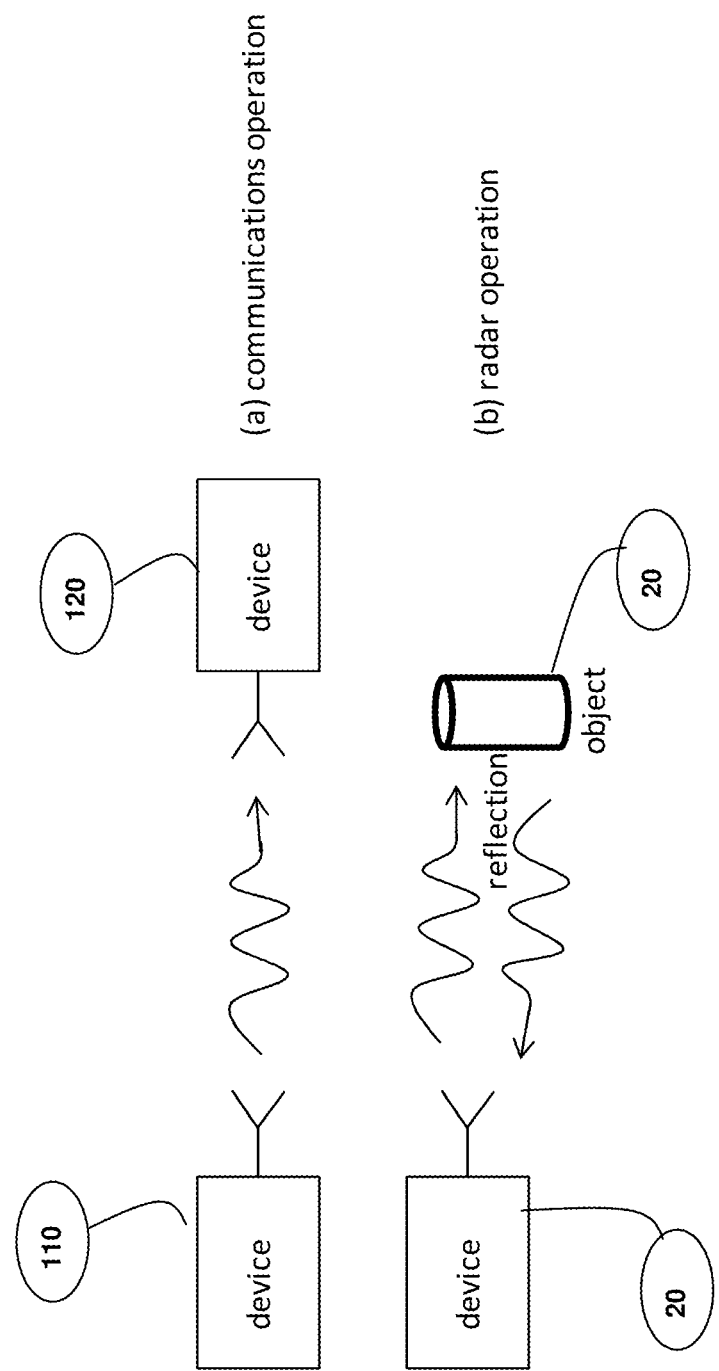
FIG. 1C schematically illustrates a signal reflected on an object according to an embodiment of the present invention.

FIG. 1C describes an illustrative embodiment of a device according to the invention some resource (s) may be allocated for:

a) (communication) a transmitting device 110 transmitting signals to a receiving device 120, b) (radar operation, i.e. object detection) a device 20 for:
transmitting signals toward an object, acting thus as a transmitting device 110, which will therefore not, in that case, communicate with another (receiving) device,
receiving signals that have reflected on an object, acting thus as a receiving device 120, which will therefore not, in that case, communicate with another (transmitting) device.

In existing 60 GHz-band systems, such as e.g. some Wireless Personal Area Networks (WPANs), the wireless network is known as a piconet, the devices are known as DEVs, and one device in the network is assigned as the network coordinator known as PicoNet Coordinator (PNC). In such networks, transmissions by different devices in the network may be formatted into time-domain structures known as superframes.

FIGS. 2A and 2B describe two illustrative embodiments of a time-domain structure or superframe 200 according to the invention. The superframe 200 begins with a short beacon, which is transmitted by the PNC 100 to all devices using a low-rate quasi-omni mode. This beacon contains general network signalling information as well as the timing schedule of channel access granted to particular links between pairs of devices during a Channel Time Allocation Period (CTAP). Following the beacon is a Contention Access Period (CAP). During the CAP, devices may communicate with each other using random contention-based access. The CAP is generally (but not exclusively) used for transmitting Medium Access Control (MAC) frames and acknowledgements. Following the CAP is the CTAP, which is generally the longest part of the superframe and is when devices communicate data with each other with high efficiency using scheduled Time Domain Multiple Access (TDMA). The PNC schedules links between pairs of devices to communicate at different times within the CTAP. The time period allocated to one link is known as a CTA (Channel Time Allocation). The CTAP may comprise one or a plurality of CTAs that may be allocated to different links. In a given CTA, the data flow is essentially unidirectional, however in certain cases the receiving DEV may send acknowledgement frames to the transmitter during the same CTA. If the CTAs within the CTAP are non-overlapping, and a CTA is allocated to only one link—there is no spatial reuse. If a CTA is allocated to several links, there is spatial reuse. When a new device searches for a piconet to join, it firstly tries to detect the beacon transmitted by the PNC, and then transmits association requests during the CAP in quasi-omni mode (since initially the correct beam patterns are unknown). During the association, the device informs the PNC of the best (broadly directional) beam pattern from the quasi-omni set that the PNC should use for future transmissions to that device. In addition, in many cases the PNC and device will perform a specific beam training procedure in order to determine the best (highly directional) beam pattern to use on both sides. A device that wishes to transmit data to another device during the CTAP makes a channel time request to the PNC during the CAP. This request contains the source and destination device IDs for the link and the length of time that channel access is required. In many cases, the device may wish to exchange a stream of data over an extended period, in which case a single request may be made for regular channel access in every subframe (or once in each several subframes) indefinitely. After receiving the request, the PNC tries to find an unused period within the CTAP with which to fulfil this request. If such is found, the PNC then schedules a CTA for this link, and includes the scheduling information in the beacon of the corresponding subsequent superframes. In conventional 60 GHz wireless networks such as IEEE 802.15.3c, if the unused period within the CTAP is inadequate to fulfil the request, it will be denied and the pair of DEVs will not be allowed to communicate. However, in a wireless network where spatial reuse is allowed, the PNC would instead try to co-schedule certain links in the same CTAs so that the request may be fulfilled. If the mutual interference between these links (as observed at the receivers) is adequately low, then this spatial reuse causes the aggregate data throughput of the network to increase.

FIG. 2A describes an illustrative embodiment of a superframe 200 according to the invention, wherein pairs of devices are each allocated different time intervals (i.e. using pure Time Division Multiple Access (TDMA), without spatial reuse). In each superframe 200, the beacon 210 is followed by the Contention Access Period (CAP) 220, then the Channel Time Allocation Period (CTAP) 230 which comprises successive Channel Time Allocations (CTAS), such as for example CTA1 232, CTA2 234, CTA3 236 and optionally unallocated resources 238. The pair (DEV1, DEV7) may be allocated CTA1 232, while pairs (DEV3, DEV6) and (DEV8, DEV5) may be respectively allocated CTA2 234 and CTA3 236. FIG. 2B describes an illustrative embodiment of a superframe 200 according to the invention, wherein some pairs of devices are allocated resources in the same CTA (i.e. same time interval), or, in other words, wherein some pairs of devices or links are co-scheduled. In each superframe 200, the beacon 210 is followed by the Contention Access Period (CAP) 220, then the Channel Time Allocation Period (CTAP) 230 which comprises successive Channel Time Allocations (CTAs), such as for example CTA1 232, CTA2 234 and optionally unallocated resources 238. The pair (DEV1, DEV7) may be allocated CTA1 232, while pairs (DEV3, DEV6), (DEV8, DEV5) and (DEV4, DEV2) may be allocated CTA2 234, i.e. co-scheduled in CTA 234, while the time interval 238 remaining after CTA2 234 in the superframe 200 may remains unallocated.

Figure 3A:
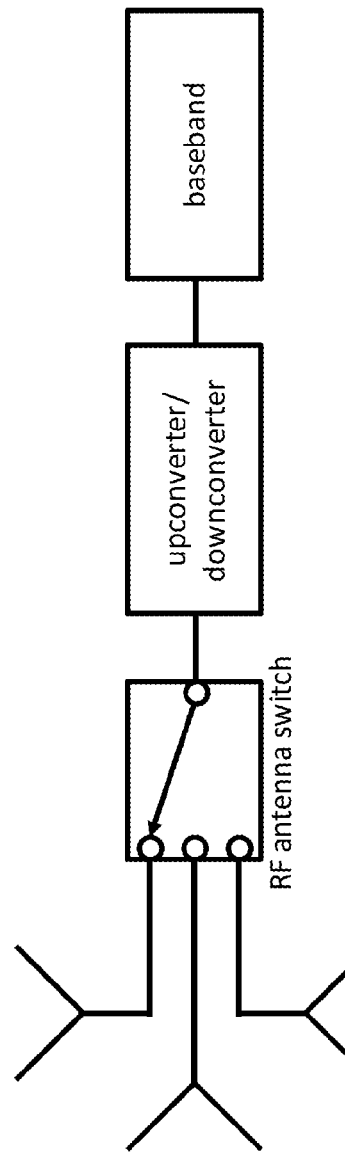
FIG. 3A schematically illustrates an antenna of a device according to an embodiment of the present invention.
Figure 3B:
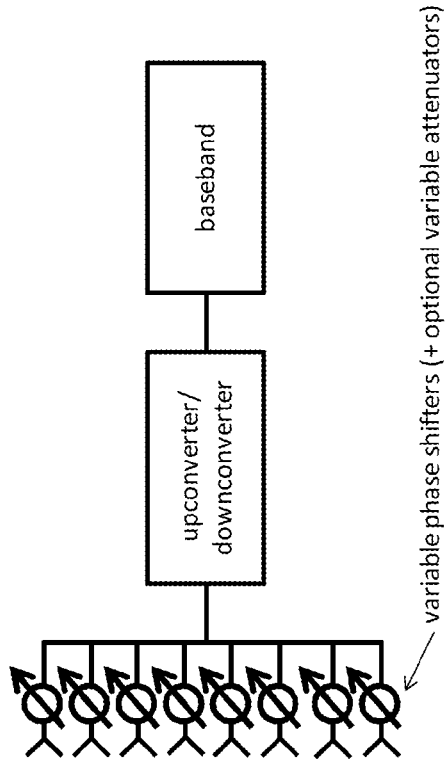
FIG. 3B schematically illustrates an antenna of a device according to an embodiment of the present invention.

In the system according to an embodiment of the invention, each device may use a directional antenna for transmitting and receiving to and from an object. As examples, two types of directional antenna assemblies may be used in 60 GHz band devices: switched sector antenna assembly and phased array antenna assembly. The switched sector antenna assembly, an example of which is shown in FIG. 3A, comprises a number of fixed antenna elements with moderate directionality, each of which covers a different region of space. One element is active at a time, and typically the active element is selected by controlling a Radio Frequency (RF) switch. The phased array antenna assembly, an example of which is shown in FIG. 3B, comprises multiple antenna elements, each of which is typically close to omni-directional. The elements are connected together through individual variable phase shifters (and sometimes variable gain controllers such as attenuators). The multiple elements together form a beam that may be highly directional (depending on the number of elements), where the beam pattern is changed by controlling the variable phase shifters (and attenuators). The antenna assemblies to which the present invention applies are not limited to these two assembly types, and may be any other antenna technologies with selectable and/or trainable directional antennas, such as multiple switched RF phased arrays, quasi-optical and Rotman lens beamformers, fully digitized antenna arrays etc. . . . . .

Figures 4, 5:
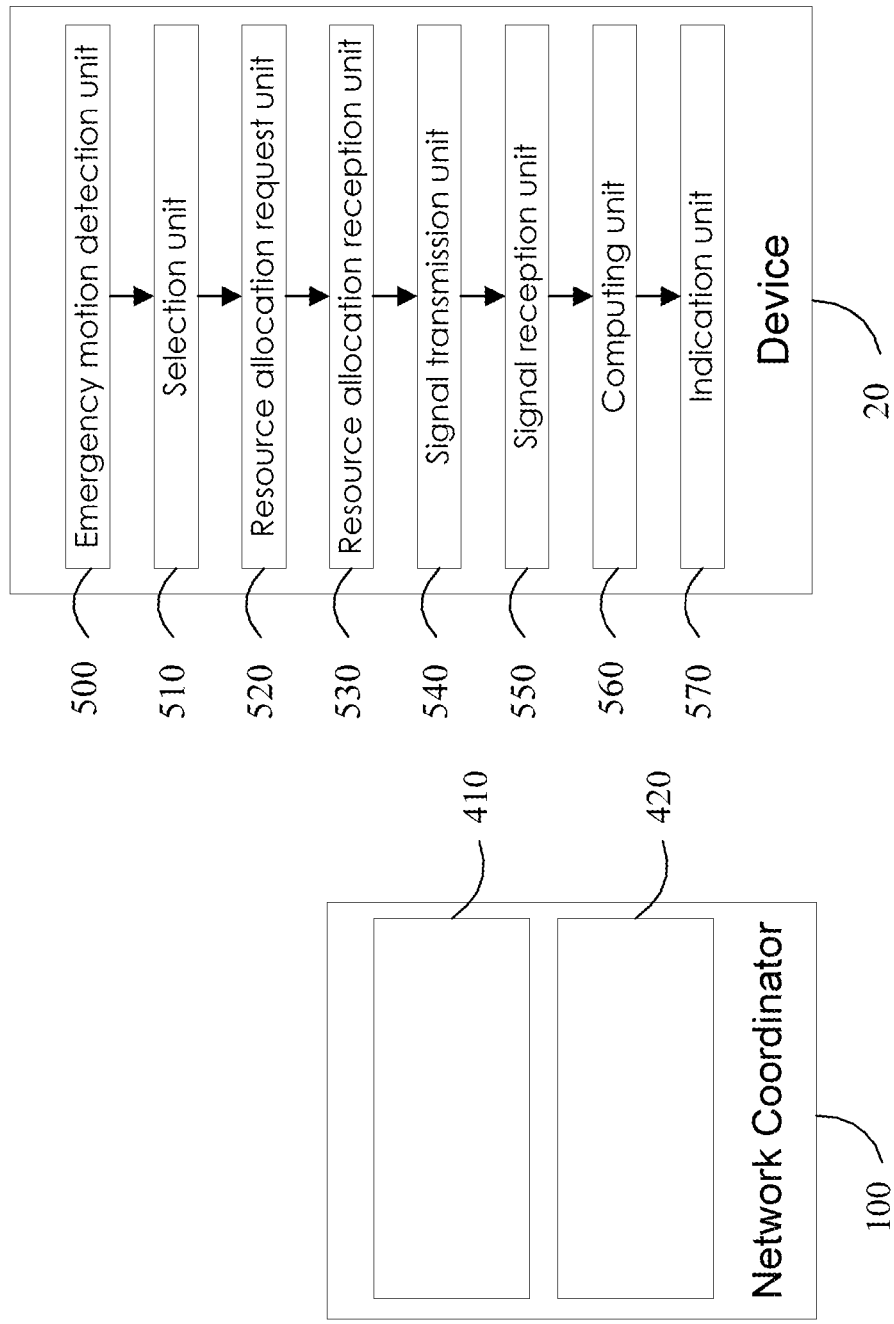
FIG. 4 schematically illustrates a network coordinating device according to an embodiment of the present invention.
FIG. 5 schematically illustrates a device according to an embodiment of the present invention.

FIG. 4 describes an illustrative embodiment of the network coordinator 100 according to the invention. In an illustrative embodiment of the network coordinator according to the invention, the network coordinator 100 may comprise an allocating unit 410 comprising means for allocating time intervals to devices. For instance, the allocating unit 410 may be used for allocating a given time interval in a given superframe to the device 20 in the telecommunication network 30. The network coordinator 100 may also comprise a scheduling unit 420 comprising means for allocating device(s) for communication. The network coordinator 100 may be a device 20 according to an embodiment of the invention.

FIG. 5 describes an illustrative embodiment of the device 20 according to the invention.

The device 20 may comprise a selection unit 510 for selecting a profile corresponding to an object to be detected.

Object

An object may be for instance a person/human body, a post, a shop, a car, a monument, any item etc. . . . An object to be detected by a device 20 is an object with a specific profile that matches a profile known of the device 20 so that the device 20 may at least detect the object, or even identify the object or its type.

An object to be detected is an object whose profile matches with a first profile selected for detection. The direction in which the object is might not be necessarily known. The device 20 may just scan its local environment to see if any object to be detected might be there or not, without necessarily knowing that any objects exist or what direction they are in.

Detection Of an Object

The device according to an embodiment of the invention is configured for generating signals suitable for object detection by acting as a radar signal generator and also for processing signals reflected from nearby objects to generate a profile (e.g. a radar image). Various conventional methods of radar operation might in principle be used to implement object detection. For example, Frequency Modulated Continuous Wave (FMCW) radar is a known technique for implementing radar, with relative low hardware complexity and high power efficiency. Pulse Doppler radar is another existing solution that used for obtaining a radar function. Pulse Doppler involves the transmission of multiple pulses of signal at regular time intervals, where the reflections corresponding to each pulse are captured and jointly processed to generate information about the local environment in terms of range and radial velocity. Angular information (in azimuth and elevation) is obtained by repeating the Pulse Doppler process consecutively where a different (transmit and receive) antenna beam angle is used each time, and is combined to form a radar image. The method, device and system according to an embodiment of the invention allow object detection using e.g. Pulse Doppler radar functionality, in a way that the device may (effectively) perform both communications and object detection simultaneously. The present method, device and system will be described here under using Doppler functionality. This is in no way limiting the scope of the present invention as any equivalent radar solution may also be used.

For a human body, the human breathing may be used for detection. For example, assuming a fast breathing vibration, i.e. when fast breathing, the fundamental frequency is around 0.5 Hz. Then, time-domain samples are required at least every 1000 ms in order to prevent undersampling. Harmonic frequencies may be also caught in order to improve or ease the accuracy of detection a given frequency, and hence distinguish a human body from other objects. In that case, oversampling may be used (e.g. to detect harmonics at 1 Hz, 1.5 Hz, etc), in which case the samples may be more closely spaced (for instance every 100 ms, or so). For a human heart rate, the fundamental frequency is 70 Hz or so, so samples may be every 5 ms or so. In this case, the sample spacing may be shorter than the superframe length. In some technologies, it might be possible for the device to request the network coordinator 100 to reduce the superframe length, or to make multiple requests at specific times in the same superframe. Alternatively, the device may request one resource for the entire period it needs (e.g. a 50 ms slot to get 10 samples). The device might even use parts of the slot for detection, and the remaining parts for communication, if it has some "free time" inside a slot it has been allocated. In the 60 GHz frequency band, human breathing detection may be more likely than human heart rate detection, since most of the 60 GHz energy reflects off the surface of the skin, rather than penetrating inside the body to the heart (although some does, and also there is small movement of the skin surface due to the movement of the heart). These values are just guides, since, as described here under in reference to FIGS. 6 and Table 1, the request parameters (slot length, spacing of slots, number of slots) are not just dependent on vibration frequency, but also on other parameters of the profile of an object (as described here under): SNR, number of azimuth/elevation angles which are multiplexed into one slot, etc. . . .

In an illustrative embodiment of the device and system according to an embodiment of the invention, reference may be made to the maximum Doppler frequency to be detected, rather than directly corresponding to the vibration frequency of the object, because that vibration does not lead to a single Doppler frequency but to a series (fundamental plus harmonics, where the harmonics get smaller as the frequency increases). In a plurality of illustrative embodiments of the device and system according to the invention, different implementations with a different number of harmonics (if any) to capture may be used in addition to the fundamental. The more harmonics are to be captured, the more sampling may require longer/more slots, bigger Fast Fourier Transform (FFT) for signal processing, etc. . . . Detection of an object may therefore be based on the relationship between the vibration (or constant velocity, for linearly moving objects) and the Doppler frequencies, which may not be precisely one equals the other. Then, the request parameters (as described here under in reference to FIG. 6 and Table 1) may be determined based on the maximum Doppler frequency of interest (plus the other parameters, through the equations given) rather than directly relating to the physical object motion.

Profile of an Object

A profile comprises attributes of an object. It may comprise for example a four-dimensional array of attributes which comes from processing the reflected signals received from an object after a previous transmission of said signals toward said object. The four dimensions (i.e. attributes) may be for instance range, radial velocity, azimuth and elevation. In other words, the value in one element of the "profile" array may be equal to the effective complex reflectivity of an object existing at the corresponding range, velocity, azimuth and elevation. The values of elements corresponding to range/velocity/azimuth/elevation where there are no objects should be zero or near zero as in reality there may be some noise or interferences. A large value in the profile may be interpreted to mean that a (significant) object exists at the corresponding range/velocity/azimuth/elevation. A simple way to decide if an object exists at a given range/velocity/azimuth/elevation may be to see whether the corresponding value in the profile is above a certain threshold or not (determination of the threshold is part of standard radar theory). In an illustrative embodiment of the device, method and system according to the invention, when using micro-Doppler (vibrations) effect, the profile may require some deeper interpretation since patterns of large values within the profile at certain spacings in the velocity dimension are being looked at (this is part of standard micro-Doppler theory).

When the profile or "radar image" has for instance four dimensions (range, azimuth, elevation, velocity), the azimuth and elevation dimensions may cover all the different directions in which the detection is performed. In other words, the detection may take place in more than one given direction. The profile array may be associated with the actual range/velocity/azimuth/elevation value to which each value in the array corresponds, and the Signal to Noise Ratio (SNR) of the profile values. For example, the profile array might be of size 100×10×6×6 (range, velocity, azimuth, elevation, respectively). In the range dimension (length 100), the values might correspond to ranges from 0.1 to 10.1 m (i.e. the first value corresponds to 0.1 m range, the second value to 0.2 m range, etc). In the velocity direction (length 10), the values might correspond to velocities from −1 m/s to +1 m/s (i.e. first value corresponds to −1 m/s, the second value to −0.8 m/s, etc) . . . . Similarly for azimuth/elevation from, say −60 to +60 degrees. The spacing between the corresponding values (e.g. 0.1 m in range, 0.2 m/s in velocity, in the example above) may be seen as the resolution of the profile in that direction. The resolution is how accurately the range/velocity/azimuth/elevation of an object may be defined. The resolution is thus directly related to the profile attributes (e.g. range resolution= (10.1−0.1)/100=0.1 m).

In an illustrative embodiment of the device according to the invention, the device may choose the attributes of the profile it generates, depending on what kind of objects it intends to detect. For example, if the device is in a living room and trying to detect a human body using micro-Doppler effect, it may require high velocity resolution, but the min/max values of velocity may be quite small (since the object is slow moving). Both minimum and maximum range may also be quite small. If it is detecting fast-moving cars outside, the velocity resolution requirement may be less severe, but the maximum velocity of the profile shall be higher (since cars are faster moving), the maximum range shall be higher (since cars may be some distance away from the device), and the minimum range may also be larger (since cars are unlikely to be extremely close to the device). The required SNR may depend on the allowed probabilities of false-alarm or missed detection (i.e. wrong detecting, or missing a target) for that application. In other words, the required attributes of the profile may be different in different applications (i.e. different types of objects to be detected).

In another example, if motion of an object to be detected is not of interest, i.e. positions of stationary objects are to be detected, the velocity may then be chosen as being 0. This corresponds to reduce to the image of the profile to three dimensions. Then a search may be performed for pixels in the image (i.e. elements or values in the array) that are above a pre-determined threshold. A separate object is deemed to exist at the range/azimuth/elevation that corresponds to that element in the image.

In another example (still with stationary objects), in general large objects (with size greater than the resolution of the radar in the range, azimuth or angular dimensions) give rise to large values at multiple pixels close to each other. For example, for a radar that has range resolution of 10 cm or so, an object such as a car of length 2 m may give rise to large values in approximately 20 consecutive pixels in the range dimension. The magnitude of some of these pixels may be much larger than others, because e.g. of a large reflection from the bonnet of the car, or one corner, and not so much from other areas (depending on the orientation of the car relative to the device). In that case, the profile obtained for the car may comprise these 20 pixels (and possible multiple pixels in the azimuth/elevation dimensions too, if the angular resolution of the radar is adequate). Some signal processing algorithm may be used to further compare this profile (namely second profile in the method according to an embodiment of the invention as described hereunder in reference to FIG. 6) against one or more reference profile(s) (namely first profile in the method according to an embodiment of the invention as described hereunder in reference to FIG. 6) that correspond to cars, in order to try to identify it as a car rather than something else. In general, this may not just be a simple process like direct comparison from a database, but may rather involve some statistical analysis of the properties (e.g. the probability density function of elements of the profile, their moments such as variance, covariance, etc) of the profile against the properties of the first profile (i.e. the reference).

In another example, when trying to detect a human body, detection may comprise searching for a series of large values of pixels in the image that correspond to the same range/azimuth/elevation (i.e. 3D position of the object), but are separated by certain amounts in the velocity direction. The amount of separation corresponds to the frequency of vibration being tried to be detected, e.g. for human breathing, or human heart rate. This search may be done using different solutions, such as cross correlation (matched filtering) with a reference or synthesized profile, or some non-linear techniques using wavelets, or many other possible methods. Again, it may not be as simple as simply looking up in a database of references, although from an intuitive point-of-view the result is similar. One reason direct comparison might not be performed from a database is that there are significant variations from person to person, depending of course on their body shape etc. . . . but also just small differences in their orientation or position create big differences in the resulting profile. Despite this, using statistical techniques allows obtaining quite good accuracy. Of course, telling apart a human from a table (one is vibrating, the other is not) is much easier than telling apart a car and a van.

For example, when detecting vibration due to movement of the chest wall, the signal processing may look for a series of large values in the velocity dimension of the profile, which are spaced by an amount that corresponds to the frequency of breathing (approx 0.3 Hz or so). On the other hand, vibrations due to heart beating may also be detected. They correspond to a series of large values spaced in the velocity dimension by an amount corresponding to 70 Hz or so (heart rate).

In an illustrative embodiment of the device and system according to the invention, a device may simply implement and expose a web interface, from which it may be remotely controlled from anywhere on the Internet. The resulting profile may be output across the same web interface (other options are also possible). In another illustrative embodiment of the device and system according to the invention, the device might be embedded, and told to start detection operations when certain conditions occur (e.g. an earthquake warning signal is received, or the mains power is cut, or a remote signal is received across the internet etc. . . . ) using a emergency detection unit as described here below in reference to unit 500.

The device 20 may comprise a resource allocation request unit 520 for requesting a resource allocation to a resource allocating entity such as for example a network coordinator 100.

In an illustrative embodiment of the device according to the invention, a network coordinator 100 may be (i.e. act) as a device 20 and performs thus the method according to an embodiment of the invention. In that case, the network coordinator 100 makes a request to itself or instead it just allocates itself directly the slots it needs in a given superframe.

The device 20 may use for instance two types of requests. A first type may be a request for just a single resource (e.g. a single time slot), and for example just the length of that time slot is defined. A second type may be a request recurring resources such as e.g. time slots, where the length of each time slot and the spacing (e.g. n superframes) is defined. Depending on the particular standard of the telecommunication network, in an illustrative embodiment of the device and system according to an embodiment of the invention, the device may be able to specify the total number of slots required, or it may only be able to set up an "indefinite" request (i.e. a time slot every n superframes, forever), where, once it no longer needs the allocations, it sends another request to cancel the request (so no more slots are reserved). For example, the device would only set n=1 if it is necessary to use time slots in every superframe for detection. i.e. if the maximum velocity required to sense an object is such that it is necessary to sample at a rate equal to the 1/superframe_length. The device considers the (average) data rate it needs, the allowable latency, the (peak) data rate it may transmit at, and from that works out n and the length of each slot, in order to meet the requirements (and also tries to reserve fewer longer slots, rather than more shorter slots, in terms of scheduling efficiency) as described here under in act 620 in reference to FIG. 6.

The device 20 may comprise a resource allocation reception unit 530 for receiving resource allocation, i.e. for being informed by a resource allocating entity of the allocated resource, in the telecommunication network 10.

The device 20 may comprise a signal transmission unit 540 for transmitting one or a plurality of signal(s) toward or in the direction of an object. Said object may be an object to be detected.

The device 20 may comprise a signal reception unit 550 for receiving one or a plurality of signal(s) sent by the signal transmission unit 540 and that would have been reflected by an object in the direction of the device.

The device 20 may comprise a computing unit 560 for computing a profile using the reflected signal(s) received from the signal reception unit 550, said profile characterizing the second object onto which the transmitted signal reflected.

The device 20 may comprise an indication unit 570 for indicating the detection of an object.

In an illustrative embodiment of the device according to the invention, the wireless communication device 20 may support an emergency motion detection mode and comprises therefore an emergency motion detection unit 500, which may initially be triggered for example by one or more of the following situations:

- loss of mains power (for a device normally connected to mains power supply)
- the reception of a specific coded wireless signal by the WLAN/WPAN receiver
- a trigger on an electrical input to the device connected internally within the appliance. This trigger may be derived from, for example, reception of an Emergency Warning Broadcast on television/radio broadcasts or other wireless or wired communications method supported by the appliance.

In an illustrative embodiment of the system and device according to the invention, outside an emergency situation, the devices may be configured (i.e. comprise means that allows) to perform motion detection and report results in order to build up aggregate information that might be useful for earthquake prediction, etc. . . . .

Figure 6:
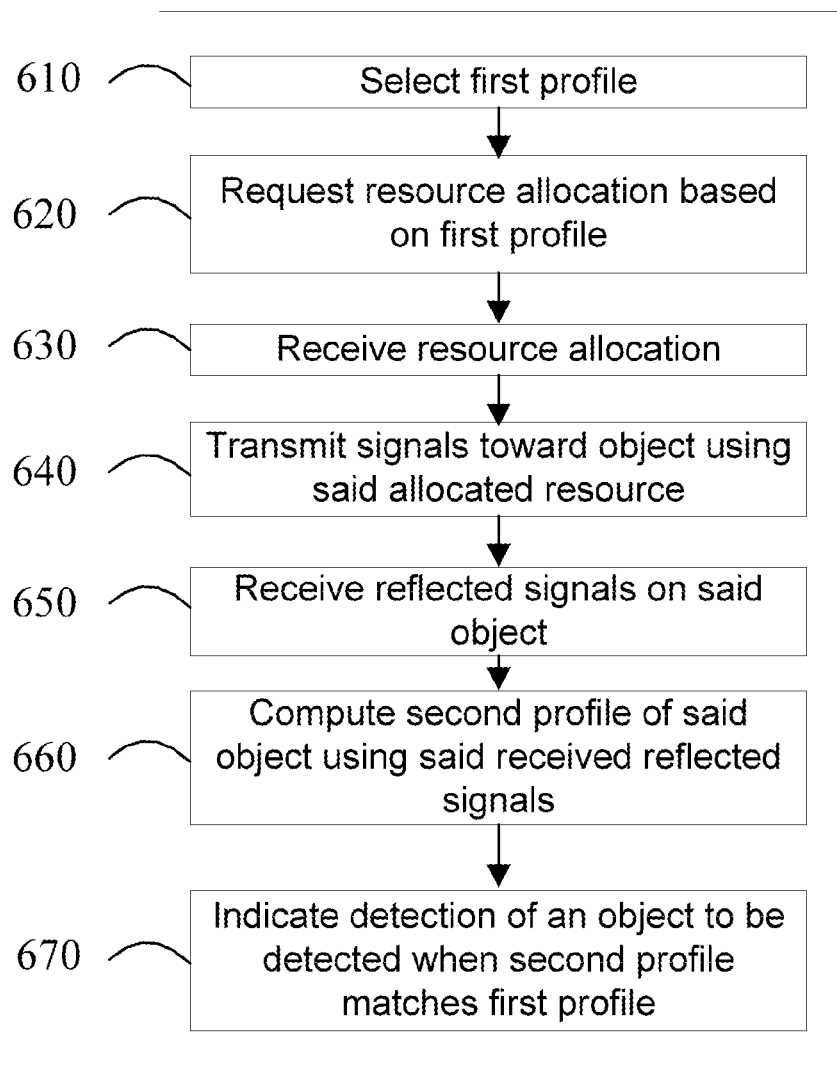
FIG. 6 schematically illustrates a method according to an embodiment of the present invention.

FIG. 6 describes an illustrative embodiment of the method according to the invention. The method according to an embodiment of the invention allows detecting an object to be detected. The object to be detected may be associated with a profile. The profile characterizes the reflection of a signal on the object. In an illustrative embodiment of the method according to the invention, the first profile may comprise attributes characterizing the first object and the second profile may comprise attributes characterizing the second object, said attributes comprising at least one of the range, azimuth, elevation and velocity.

The method according to an embodiment of the invention may be carried out by a device in a telecommunication network 10 and comprises several acts as described here under (in reference to the units of FIG. 5).

In an illustrative embodiment of the method according to the invention, the method may further comprise an act of obtaining a request for triggering the selection of the first profile. This request may typically be generated by an applications processor in the same device or a running software that controls the object detection capability of the device to provide a specific service (e.g. security detection, emergency human detection, etc) for example using the emergency motion detection unit 500 (in reference to FIG. 5 as described here above). The triggering of the request may arise from various sources, for example, user input to the software, remote control of the software, or automatic scheduling by the software. The request may be made together with several parameters as described in Table 1 here below, which define the range and size of the radar image (in azimuth, elevation, range and radial velocity dimensions) from which objects may be detected. These parameters shall be compatible with the known object detection capabilities of the device.

TABLE 1

Parameters specified in request for object detection

| Parameter | Unit |
| --- | --- |
| Minimum and maximum range $R_{min}$, $R_{max}$ | Metres |
| Maximum radial velocity $v_{max}$ | Metres/second |
| Radial velocity resolution (half-power) $v_{res}$ | Metres/second |
| SNR of radar image (per array element) at maximum range $(SNR)_{image}$ | dB |
| Minimum and maximum azimuth angle $\phi_{min}$, $\phi_{max}$ | Degrees |
| Azimuth angle sample spacing $\phi_{spacing}$ | Degrees |
| Minimum and maximum elevation angle $\theta_{min}$, $\theta_{max}$ | Degrees |
| Azimuth elevation sample spacing $\theta_{spacing}$ | Degrees |

In an act 610, a selection unit 510 allows selecting a first profile corresponding to a first object to be detected.

In an illustrative embodiment of the method according to the invention, the act 510 may comprise determining attributes for a first profile corresponding to a first object to be detected. In an illustrative embodiment of the method according to the invention, a first profile may be automatically or systematically selected, such as for example if the device is only configured to detect of single type of object (i.e. know or may only use one type of profile which is therefore selected by default).

In an illustrative embodiment of the method according to the invention, the selection of the first profile may be performed automatically by the device. For example, the automatic selection may be a default choice of a first profile.

In an illustrative embodiment of the method according to the invention, the device may compare the computed second profile with at least one profile of a set of first profiles. Said set of profiles is accessible to the device. For example, this/these first profile(s) may be stored in a database the device may access (stored on the device or external). This/these comparison(s) may be performed automatically or on request to the device.

In an act 620, a resource allocation request unit 620 allows requesting, based on the first profile, a resource allocation to the communication network. Any method may be used for making the request, since different technologies and standards might each have their own different method.

In an illustrative embodiment of the method according to the invention, the resource allocated for detection may be allocated with a high priority among the resources allocated in the communication network.

In an illustrative embodiment of the method according to the invention, the request may be based on attributes determined in act 510.

In an illustrative embodiment of the method according to the invention, the attributes of the profile directly correspond to the resource allocation required to do the detection. In other words, the resource corresponds to a time slot at a defined time interval, said defined time interval being based on at least one attributes of the first profile. For example, as described here above in reference to the definition of object detection in FIG. 5 act 510, the resource allocation request for a fast breathing human body is around 0.5 Hz which requires for detection for example a sample every 500 ms, which means the resource allocation shall correspond to a time slot every 500 ms. In another example, if a high velocity resolution is required, then the total "observation time" (total period over which detection is done) shall be long. If a high maximum velocity is required, then the spacing of each signal transmission/reception shall be short (according to Nyquist requirement). If the maximum range is large, then the time required for each detection shall be large because the delay between transmission and reception is large. If the SNR is high, then the total amount of transmitted energy shall be increased. This therefore requires transmissions over a longer period of time.

For example, after an earthquake, if the device is to perform nearby human bodies detection, the device does not know where the human bodies are, nor does it know even a human body exists. A selection of a first profile corresponding to a human body is performed prior to detection of said human body. This allows using said first profile to further compare with a second profile/image with adequate resolution in the velocity domain to detect a human's micro Doppler profile (that series of large values spaced by a certain amount according to the breathing rate or heart rate). Therefore it will set the allocation request in order to achieve this.

In another example, device may be used as a vehicular collision radar. It does not know where the nearby cars are, but a first selected profile may comprise the range (and maybe velocity) of nearby cars for detection. Therefore the allocation requests may comprise a resource allocation corresponding to a velocity up to e.g. 150 km/h.

In an illustrative embodiment of the method according to the invention, the device may perform a request for each individual slot it needs . . . e.g. it makes a request for 1 time slot during the previous superframe before it requires that slot. This may be useful in telecommunication networks where it is not possible to specify a recurring request. The outcome is the same, just the method of actually requesting is different (either one request at the start, or multiple requests at the appropriate times).

In another illustrative embodiment of the method according to the invention, when a very large number of very short resource requests are made, it becomes impractical to schedule wireless communications between those slots. In that case, interleaving transmissions made in different angular directions may be used as described here under.

When a first profile has been selected, the device may determine the type of request it needs to perform in order to detect the object to be detected. The type of resource allocation allocated by the network coordinator 100 shall allow the device to make transmissions and receive reflections signals without causing or suffering from interference in order to obtain an accurate detection. For the periods during which the device is receiving for the purpose of object detection, transmissions from other devices (either for communications or object detection) that could interfere with reception of these weak reflected signals shall be prevented. Similarly, for the periods during which a device is transmitting signals for object detection, other concurrent use of the channel (either for communications or object detection) with which these transmissions may interfere shall be prevented.

Figure 7A:
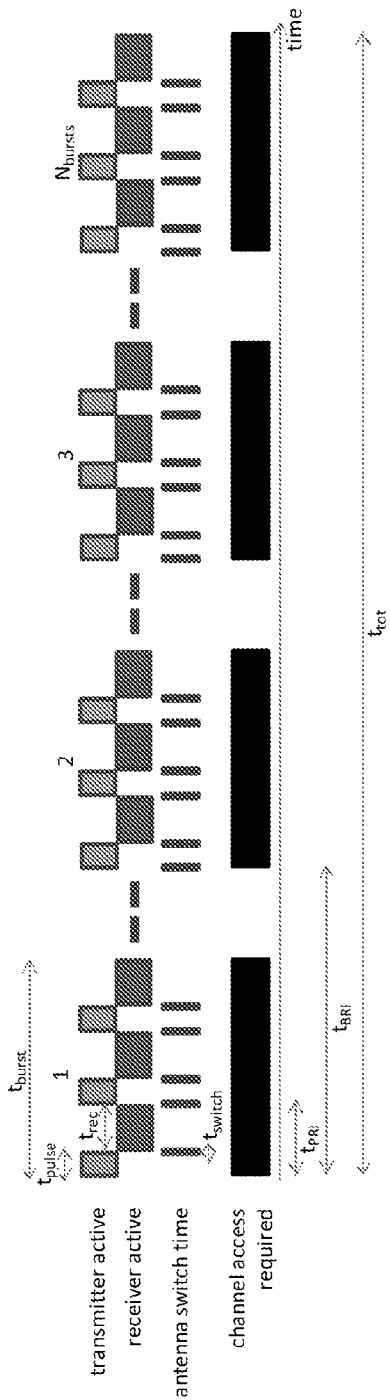
FIG. 7A schematically illustrates a pulse transmission scheme and required channel access according to an embodiment of the present invention.

The basic structure of the transmitted and received signals to generate the second profile (i.e. in this illustrative embodiment, the radar image) in one angular direction is shown in FIG. 7A, where $N_{bursts}$ bursts of pulses are transmitted and received at regular intervals. Each pulse has length $t_{pulse}$, while each burst consists of $N_{perburst}$ pulses ($N_{perburst}$=3 in the example in FIG. 7A) and has length $t_{burst}$. After each pulse is transmitted, the receiver captures the reflections of that pulse from objects in the local environment. The start of each burst is separated in time by the Burst Repetition Interval (BRI) $t_{BRI}$. The justification for this transmission scheme, and definitions of the variables, are described below.

The pulse length $t_{pulse}$ is chosen taking account of the design of the device hardware. Some device designs use separate antennas for transmission and reception. However, other architectures are also common where just a single antenna is used, which is connected to the transmitter and receiver chains using either an RF antenna switch or a directional coupler. In all of these architectures, there is in practice some leakage between the transmitter and receiver, either due to coupling between the transmit and receive antennas (for the case of separate antennas), or due to coupling in the RF antenna switch or directional coupler (for the case of a shared antenna). In addition, devices using an RF antenna switch are unable to transmit and receive at the same time. Therefore, in order for the method according to an embodiment of the invention to be compatible with all such architectures, and also in order for the weak received reflected signals not to be swamped by the transmitter leakage, the pulse length may be limited so that, when the first (wanted) reflections of a given pulse are received, the transmitter might have already finished transmitting the pulse. Therefore, the pulse length may be given by:

$$t_{pulse} = \frac{2R_{min}}{c} - t_{switch} \quad 1)$$

where, with reference to Table 1, $R_{min}$ is the minimum range requested for the radar image, $c \approx 3 \times 10^8$ is the speed of light in free space, and $t_{switch}$ is the switching time of the RF antenna switch (which equals zero if the device architecture does not uses an antenna switch).

After each pulse has been transmitted (and the RF switch has connected the antenna to the receiver chain), the receiver may be activated for a period of time that is adequate for capturing all received pulses reflected from objects over the requested range swath (the difference between the maximum and minimum requested range), i.e. corresponding to the first profile, which may be given by:

$$t_{rec} = t_{pulse} + \frac{2(R_{max} - R_{min})}{c} \quad 2)$$

After the receiver capture has finished, the next pulse in the burst may be transmitted (after the RF switch has reconnected to the transmitter). Therefore, the spacing of the transmitted pulses within a burst, known as the Pulse Repetition Interval (PRI), may be given by:

$$t_{PRI} = t_{pulse} + t_{rec} + 2t_{switch} \quad 3)$$

Thus, the burst length may be given by:

$$t_{burst} = t_{PRI} N_{burst} \quad 4)$$

Each burst of pulses represents one sample used to measure movement of the objects in the local environment. Therefore, the spacing of the bursts, known as the Burst Repetition Interval (BRI), may be calculated according to the Nyquist sampling theorem for the maximum possible Doppler frequency $f_{D\ max}$, giving:

$$t_{BRI} = 1/2f_{Dmax} = c/4f_c v_{max} \quad 5)$$

where $v_{max}$ is the maximum radial velocity of objects in the local environment and $f_c$ is the nominal carrier frequency of the pulses.

The minimum length of time $t_{tot}$ for which bursts of pulses shall be transmitted may be calculated according to the Doppler frequency resolution $f_{Dres}$, resulting in the inequality:

$$t_{tot} = N_{bursts} t_{BRI} \geq 1/f_{Dres} = c/2f_c v_{res} \quad 6)$$

where $v_{res}$ is the requested radial velocity resolution.

The reason for transmitting multiple pulses in each burst is that, since the length of each pulse must be short, in general a large number of pulses shall be transmitted over $t_{tot}$ in order for the total transmitted energy to be large enough to achieve the requested radar image SNR. While in principle these pulses may be evenly distributed in time over $t_{tot}$, it may be preferred instead to transmit groups of pulses in closely spaced bursts, since the objects in the local environment are approximately stationary over the burst period $t_{burst}$ and hence the complexity of the Doppler processing at the receiver (as described in reference to act 660) is significantly reduced. In addition, the number of discrete channel access periods is reduced (each has a longer length), which will tend to reduce the impact of object detection on the scheduling performance of the WLAN/WPAN system in terms of communications spectral efficiency. Since the bursts are spaced at the critical Nyquist rate for the maximum Doppler frequency, this condition may be expressed as the inequality:

$$t_{burst} \leq t_{BRI}/10 \qquad 7)$$

The integration gain $G_{int}$ required to obtain the requested SNR of the radar image $(SNR)_{image}$ defined at the maximum range $R_{max}$ for an object with unity Radar Cross Section (RCS), may be calculated as follows. In a Pulse Doppler radar, integration gain may be obtained from two sources—matched filtering (pulse compression) of each received pulse, and integration of multiple pulses during Doppler processing. Assuming that each complex baseband pulse to be transmitted has constant magnitude over its length, the (power-wise) integration gain due to matched filtering is equal to the time-bandwidth product of the pulse $t_{Pulse}B$ (where B is the baseband bandwidth), while the integration gain due to integration of multiple pulses in Doppler processing is simply equal to the total number of pulses $N_{tot}=N_{perburst}N_{bursts}$ (which must be an integer) transmitted during $t_{tot}$. The required integration gain may be given by $G_{int}=(SNR)_{image}/(SNR)_{input}$, where $(SNR)_{input}$ is the expected SNR at the input to the receiver given by the well-known radar range equation, which may be written as the inequality:

$$G_{int} = t_{pulse}BN_{perburst}N_{bursts} \geq \frac{(4\pi)^3 f_c^2 R_{max}^4 F_{noise} kTB(SNR)_{image}}{c^2 P_t G_t G_r} \qquad 8)$$

where $P_t$ is the transmitter power (during the duration of each pulse), $G_t$ and $G_r$ are the gain of the transmit and receive antennas, respectively, $F_{noise}$ is the noise figure of the receiver, $k \approx 1.38 \times 10^{-23}$ is the Boltsmann constant, and T is the temperature of the receiver in Kelvin (nominally T=290).

Therefore, after calculating $t_{pulse}$, $t_{PRI}$ and $t_{BRI}$ from Equations (1), (3) and (5), respectively, the device may then calculate integer values for $N_{perburst}$ and $N_{bursts}$ that meet the following three inequalities, derived from Equations 4 to 8:

$$N_{bursts} \geq \frac{c}{2f_c v_{res} t_{PRI}} \qquad 9)$$

$$N_{bursts} \geq \frac{(4\pi)^3 f_c^2 R_{max}^4 F_{noise} kT(SNR)_{image}}{c^2 P_t G_t G_r t_{pulse} N_{perburst}} \qquad 10)$$

$$N_{perburst} \leq \frac{c}{40 f_c v_{max} t_{PRI}} \qquad 11)$$

Next, the device may determine the parameters of the channel access request to be made in order to generate the complete radar image in all angular directions. Antennas may in practice comprise simply a single, fixed aperture, or may comprise a system of multiple antenna elements in the form of an array (e.g. phased array) or switched beam antenna that is controlled by the baseband processor. In the latter case, the device may form a radar image in multiple antenna directions by repeating the scheme shown in FIG. 7A multiple times, where each time the angle of the antenna beam is changed. The total number of angular positions $N_{angpos}$ requested for the radar image (i.e. the number of different beam positions, in both azimuth and elevation), may be given by:

$$N_{angpos} = \frac{(\varphi_{max} - \varphi_{min})}{\varphi_{spacing}} \frac{(\theta_{max} - \theta_{min})}{\theta_{spacing}} \qquad 12)$$

Figure 7B:
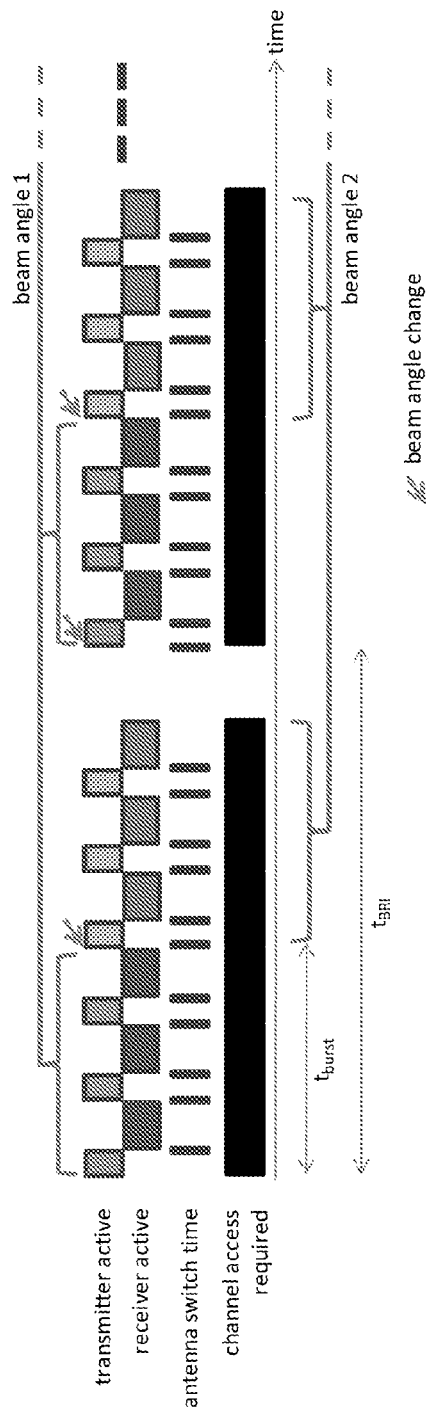
FIG. 7B schematically illustrates a pulse transmission scheme and required channel access channel times for bursts of pulses with two repetitions for beam angles 1 and 2 interleaved according to an embodiment of the present invention.

In the case that, with the above chosen parameters, $N_{int\ er}=\text{floor}(t_{BRI}/t_{burst})>1$ (i.e. there are significant gaps between each burst), up to $N_{int\ er}$ (where $N_{int\ er} \leq N_{angpos}$) repetitions with different beam angles shall be interleaved into these gaps, as shown in the example in FIG. 7B for $N_{int\ er}=2$. The advantage of this interleaving is that the total time required to complete transmissions for the complete radar image (for all angular directions) is reduced. This is particularly important where very accurate velocity resolution is requested (in practice $t_{tot}$ may be several seconds) and $N_{angpos}$ is large, since without interleaving the total time $N_{angpos} t_{tot}$ required to generate the radar image may be unacceptably high. If $N_{int\ er} < N_{angpos}$ this interleaved scheme shall be repeated in time so that, in total, $N_{angpos}$ repetitions are performed. If $N_{int\ er}=1$, no interleaving is possible and the scheme shall be repeated in time $N_{angpos}$ times. Note that, if the antennas comprise simply a single, fixed aperture, $N_{angpos}=1$ is the only allowable value.

The exact nature of the resource allocation request may depend on the underlying Medium Access Control (MAC) scheme of the wireless network protocol. In WPAN standards such as 802.15.3, one device in a piconet is designated as the centralized coordinator, or PicoNet Coordinator (PNC), and is responsible for transmitting beacons at the start of each superframe. Based on requests from devices in the piconet to transmit data, the PNC schedules exclusive access to the channel using Time Division Multiple Access (TDMA) within a portion of the superframe called the Channel Time Allocation Period (CTAP). A similar scheme is defined for the 802.11ad standard, where the coordinator is known as the PBSS Control Point (PCP), the superframe is known as the Beacon Interval (BI), and the PCP may schedule access to the channel using TDMA in slots known as Service Periods (SP). On the other hand, 802.11-based WLAN devices (based on 802.11e Quality-of-Service) typically use Enhanced Distributed Channel Access (EDCA), where there is no centralized coordinator, and access to the channel is moderated using prioritized Carrier Sense Multiple Access with Collision Avoidance (CSMA/CA), where carrier detection may be performed by various methods including a request/clear-to-send (RTS/CTS) scheme.

The method according to an embodiment of the invention may be compatible with MAC schemes using either TDMA-based or RTS/CTS-based schemes, although the same techniques may be applicable to other access schemes, which is therefore not limiting the scope of the present invention to the schemes mentioned here above.

In practice, in any of the above schemes, there is a minimum granularity for the channel access period that may be requested. Therefore, if the granularity or latency is not adequate to reserve for each channel access individually, instead the device shall "block book" the channel to cover several channel access periods. However, since doing so might adversely impact the data throughput of the network (since data transmissions cannot be scheduled in the gaps between required channel access), in an illustrative embodiment of the system according to the invention, the use of TDMA access with fine granularity may allow avoiding impacting the data throughput of the network.

In an illustrative embodiment of the system according to the invention, wherein TDMA access with fine granularity is used, the device may determine the length of each channel access $t_{access}$, the channel access repetition interval $t_{accessRI}$ and the number of channel access required $N_{accesses}$ to complete a radar image in all angular directions. (Note, by default, $t_{access}=N_{int\ er}t_{burst}$, $t_{accessRI}=t_{BRI}$ and $N_{accesses}=\text{ceil}(N_{angpos}/N_{int\ er})t_{bursts}$)

In some TDMA-based networks, the device may be able to make a request to the coordinator comprising these three parameters, as shown in Table 2 here under, in response to which the coordinator may schedule all the required channel access periods required without any further requests being necessary. In other TDMA-based networks where such a request is not supported, the device shall make a request for each channel access period in turn shortly before it is required. Note that, if the device is also the network coordinator, it may simply schedule its own access periods as described in act 620.

In an illustrative embodiment of the system according to the invention, wherein the underlying MAC scheme supports only RTS/CTS, then a suitable so-called "CTS-to-self" message shall be transmitted prior to every required channel access.

Additional channel access requests may also be made at any time by the same device for the purpose of wireless communications. In this way, although the channel access allocations for object detection and communications are unique and separate in time, effectively (at the user equipment level) the device may be capable of performing both object detection and wireless communications simultaneously, and transparently to other devices.

TABLE 2

Parameters specified in request for channel access for object detection

| Parameter | Unit |
|---|---|
| Length of each channel access $t_{access}$ | Seconds |
| Channel access repetition interval $t_{accessRI}$ | Seconds |
| Number of channel accesses required $N_{accesses}$ | — |

After the device transmits the channel access request, it is received by the coordinator and/or other devices in the network.

In the case of a TDMA-based network, the coordinator may process the received request along with all other requests received from devices in the network to determine subsequent scheduling of channel access time slots.

In an illustrative embodiment of the system according to the invention, the coordinator may treat channel access requests made for the purpose of object detection with high priority, and schedule the time slots (as far as possible) at the requested intervals in order to allow regular sampling for accurate velocity estimation. Channel access requests made for the purpose of data communication may be treated with lower priority, since the position of the allocated time slots within each superframe is generally not important. If $t_{accessRI}$ is smaller than the superframe length, then more than one position may be allocated to the device in the same subframe.

Figure 7C:
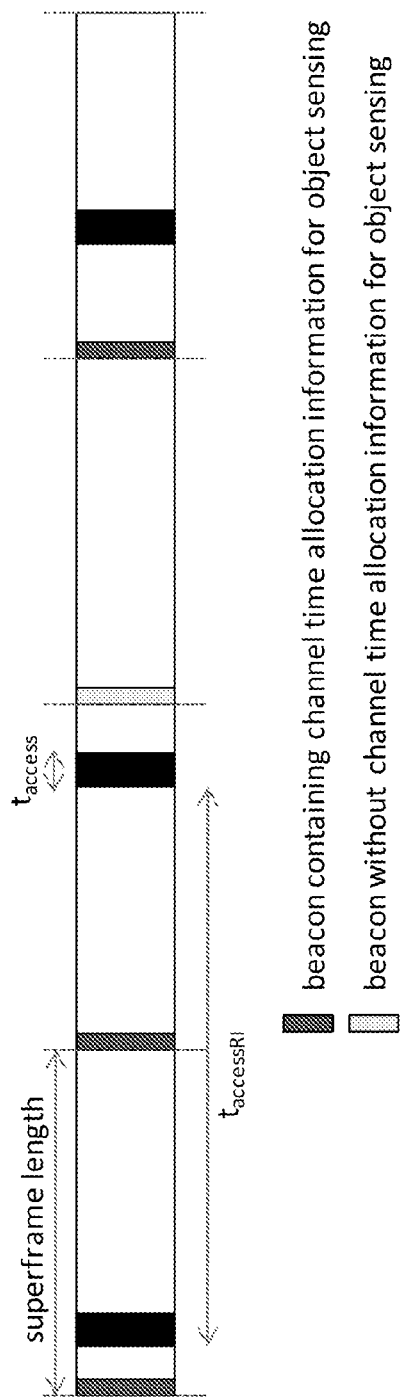
FIG. 7C schematically illustrates a channel allocation in superframes with TDMA access according to an embodiment of the present invention.

An example of the resulting structure is shown in FIG. 7C. The response from the controller to the device may take the form of information embedded in the beacon at the start of each superframe, which states the length and position of the channel access allocated to the device during that superframe.

On the other hand, if the underlying MAC scheme supports only RTS/CTS, the transmission of a "CTS-to-self" message without collisions may provide the device channel access for the corresponding length of time.

In an act 630, a resource allocation reception unit 530 allows receiving the resource allocation from the telecommunication network. The first time that the device receives a channel allocation response (either in the form of a superframe beacon or after a CTS transmission), it may start an internal timer that records the timing of each subsequent transmit and receive event.

In an act 640, a signal transmission unit 540 allows transmitting a signal in the direction of a second object using said allocated resource. In an act 650, a signal reception unit 550 allows receiving a reflected signal, corresponding to the reflection of the transmitted signal on the second object. The device may select the appropriate beam angle and begin transmitting the pulses scheduled during this channel access period and receiving their reflections, as per the scheme defined in act 620. The waveform of each pulse may be identical, and may be designed to maximize the transmitted power per pulse (given a fixed peak transmitter power), to have good radar ambiguity function properties (i.e. a delta-like autocorrelation function, so that the peak response in the range/Doppler domain after matched filtering and Doppler processing may be as sharp as possible with low sidelobes), and also to meet regulatory requirements for out-of-band emissions, within the constraint of the pulse length $t_{pulse}$. Therefore, the preferred waveform for each pulse may be the well-known linear chirp with raised-cosine time-domain window, where the complex baseband waveform x(t) is defined as:

$$x(t) = M(t)\exp\left(j\pi\left(-pB + \frac{tpB}{T_{pulse}}\right)t\right) \quad 13)$$

where t is time over the pulse (i.e. t=0 at the start of each pulse), p is the nominal bandwidth occupation with nominal value p=1 and 0<p≤1, and M(t) is the windowing function defined as:

$$M(t) = \begin{cases} 1 & \text{if } \left|t - \frac{T_{pulse}}{2}\right| \leq \frac{T_{pulse}(1-\alpha)}{2(1+\alpha)} \\ \frac{1}{2} + \frac{1}{2}\cos\left(\left(\left|t - \frac{T_{pulse}}{2}\right| - \frac{T_{pulse}(1-\alpha)}{2(1+\alpha)}\right)\frac{\pi(1+\alpha)}{T_{pulse}\alpha}\right) & \text{if } \frac{T_{pulse}(1-\alpha)}{2(1+\alpha)} < \left|t - \frac{T_{pulse}}{2}\right| \leq \\ 0 & \text{if } \left|t - \frac{T_{pulse}}{2}\right| > \frac{T_{pulse}}{2} \end{cases} \quad 14)$$

where $\alpha$ is the roll-off constant, with nominal value $\alpha=0.25$. Note that $\alpha$ may be increased and/or p may be decreased if greater out-of-band attenuation is required, at the expense of some degradation in transmit power and range/Doppler resolution. The nominal (half-power) range resolution of this pulse is approximately $\delta R=5c/8pB$ (i.e. approximately 10 cm for B=2 GHz with p=1). It will be appreciated by those skilled in the art that the scope of the present invention is not limited to such pulse waveforms and that therefore various other pulse waveforms may be used instead, with substantially similar results.

Figure 7D:
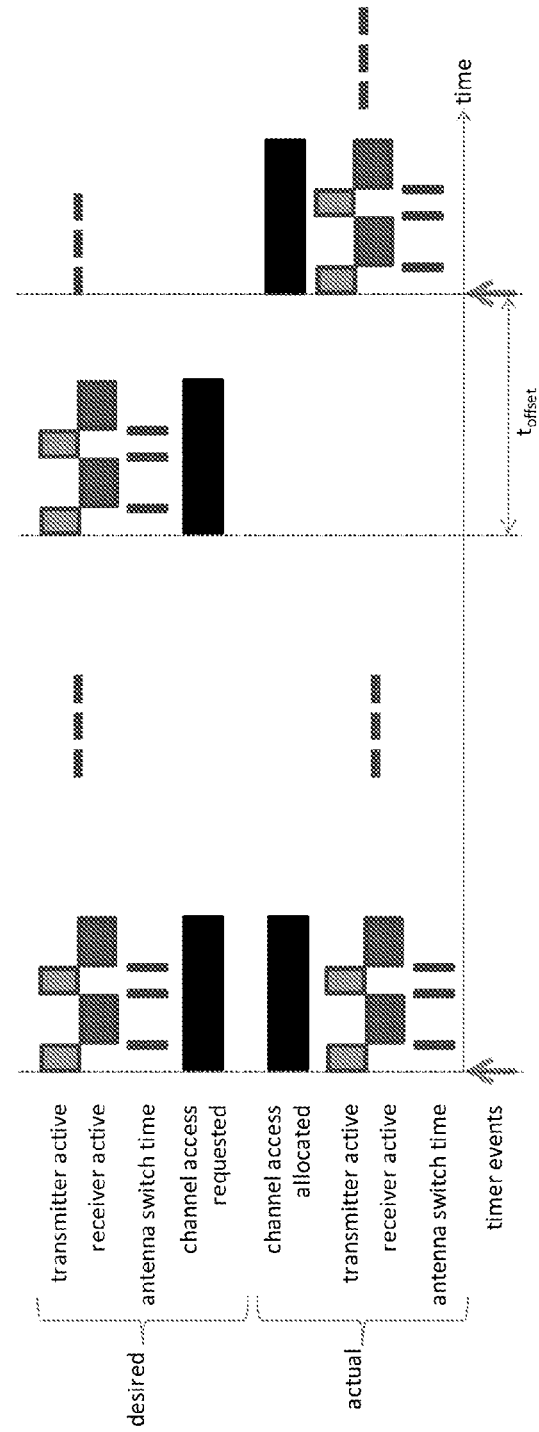
FIG. 7D schematically illustrates a channel allocation in superframes with TDMA access according to an embodiment of the present invention.

Although ideally the timing of the allocated channel access periods shall exactly match those requested by the device, there may be occasions where this does not occur. For instance, in the case of TDMA access, the coordinator may be unable to allocate the channel at exactly the requested times due to necessary control signaling, or specific requests for the exact timing may not be supported. In the case of RTS/CTS access, there may be channel contention. In these situations, the device shall begin transmission/reception as soon as the allocated channel access begins, and also should record for each burst the difference in time $t_{offset\_i_{burst}}$ between the desired start time of the $i_{burst}$th burst and the actual start time when it is transmitted. An example is shown in FIG. 7D, where the burst on the right-hand side is delayed (note that in principle $t_{offset\_i_{burst}}$ may be positive or negative).

Within each receiver active period $t_{rec}$, the receiver may optionally sweep increase the amplifier gain according to a predetermined function $\alpha_{rxgain}(t)$. Since, on average, the power of received pulses reflected from objects decreases as the range increases (due to increased propagation loss), this gain sweep may improve the effective dynamic range of the receiver, which is useful particularly for a wideband ADC with limited resolution (number of bits).

In an act 660, a computing unit 560 allows computing a second profile using the received reflected signal, said second profile characterizing the second object onto which the transmitted signal reflected. Signals are transmitted and received by the device 20 in order to generate the second profile. This happens during periods where the resource (e.g. a time interval) is granted (i.e. allocated) to the device, so as to not cause mutual interference with wireless communications in the network.

In an illustrative embodiment of the method according to the invention, the second profile may be computed based on the Doppler effect of the received reflected signal on the second object. This may allow the detection of moving objects.

The device may then process the signals captured during all receiver active periods together with the timings $t_{offset}$ determined by the internal timer to form a second profile such as e.g. a radar image. The complex baseband received signal in the discrete time domain corresponding to the $i_{pulse}$th pulse of the $i_{burst}$th burst for the $i_{angpos}$th antenna beam angle may be defined as $y_{i_{pulse},i_{burst}}^{(i_{angpos})}[i]$, where $i=\{0, 1, \ldots, t_{rec}B\}$ is the time-domain sample index referenced to the start of each receiver active period.

Firstly, the device may generate two arrays, one containing the desired timing of each burst, and one containing the actual transmission timing of each burst, taking into account $t_{offset}$:

$$t_{desiredburst}=[0,t_{BRI},2t_{BRI},(N_{bursts}-1)t_{BRI}] \quad (15)$$

$$t_{actualbuts}=[0+t_{offset\_1},t_{BRI}+t_{offset\_2},2t_{BRI}+t_{offset\_3}, (N_{bursts}-1)(t_{BRI}+t_{offset\_N_{bursts}})] \quad (16)$$

Secondly, for each burst of one beam angle, the device may coherently sum the received signals corresponding to all pulses as follows:

$$\overline{y}_{i_{burst}}^{(i_{angpos})}[i] = \sum_{i_{pulse}=1}^{N_{pulses}} y_{i_{pulse},i_{burst}}^{(i_{angpos})}[i] \quad (17)$$

Since the reflecting objects are approximately stationary during one burst, and since the entire device (baseband timer and logic, DAC, upconverter, downconverter and ADC) is phase coherent due to phase-locking of all internal clocks and oscillators, this coherent summation constructively integrates the received signals resulting in integration gain. Assuming the received signals are sampled at the critical sample rate B, the integrated signal may be written in the form:

$$\overline{y}_{i_{burst}}^{(i_{angpos})}[i] = A_{sig} \sum_k A_{i_{burst}}^{(i_{angpos}),k} x\left(\frac{i}{B} - \frac{2R_{i_{burst}}^{(i_{angpos}),k}}{c}\right) + n[i] \quad 18)$$

where $A_{i_{burst}}^{(i_{angpos}),k}$ burst is the complex reflectivity of the kth object in the $i_{angpos}$th beam, $R_{i_{burst}}^{(i_{angpos}),k}$ burst is the range of that object, $A_{sig}$ is the nominal signal amplitude after pulse integration, and n[i] is the receiver noise after pulse integration. If the receiver sweep increased the gain during the capture period for each pulse, this should now be inverted by multiplying $\overline{y}_{i_{burst}}^{(i_{angpos})}[i]$ burst by the corresponding function $1/\alpha_{rxgain}(i/B)$ Thirdly, the device may calculate the linear cross-correlation of each integrated signal with the transmitted pulse waveform. This may be implemented either directly in the time-domain, or in the frequency domain using the well-known FFT-based method (i.e. zero pad, FFT, conjugate multiplication, IFFT, remove zero pad), resulting in:

$$z_{i_{burst}}^{(i_{angpos})}[i] = \overline{y}_{i_{burst}}^{(i_{angpos})}[i] \otimes x[i] \quad 19)$$

$$= A_{sig} \sum_k A_{i_{burst}}^{(i_{angpos}),k} u\left(\frac{i}{B} - \frac{2R_{i_{burst}}^{(i_{angpos}),k}}{c}\right) + (n[i] \otimes x[i])$$

where $\otimes$ represents the discrete linear cross-correlation operation, and u(t) is the linear auto-correlation function of x(t). Since x(t) was designed so that u(t) approximates a delta function (within the constraints of the finite bandwidth), $z_{i_{burst}}^{(i_{angpos})}$ describes the complex reflectivity of the local environment in the beam direction as a function of range.

Fourthly, the device may generate a series of arrays, where the values of each array are taken from one index ("range bin") from $z_{i_{burst}}^{(i_{angpos})}$ over all bursts as follows:

$$m_i^{(i_{angpos})}[i_{dopsampl}]=[z_{i_{burst}=1}^{(i_{angpos})} [i],z_{i_{burst}=2}^{(i_{angpos})}[i], \ldots ,z_{i_{burst}=N_{bursts}}^{(i_{angpos})}[i]] \quad 20)$$

Then, linear interpolation may be performed to resample each array which currently has sample times given by $t_{actualburst}$, to the sample times given by $t_{desiredburst}$, resulting in the array $\overline{m}_i^{(i_{angpos})}$. Other well-known interpolation techniques (e.g. polynomial, spline, etc) may be used instead without limiting the scope of the present invention with various trade-offs between interpolation accuracy and computational complexity.

Fifthly, the device may calculate the Doppler spread associated with each range bin for example by performing the Fast Fourier Transform of each resampled array $\overline{m}_i^{(i_{angpos})}$ as follows:

$$d_i^{(i_{angpos})}[i_{dopfreq}] = \quad 21)$$

$$\sum_{i_{dopsamp}=0}^{N_{bursts}-1} \overline{m}_i^{(i_{angpos})}[i_{dopsamp}]\exp(-j2\pi i_{dopfreq} i_{dopsamp}/N_{bursts})$$

The required FFT point size is equal to $N_{bursts}$, which for many practical cases may be small enough to implement in the same dedicated FFT hardware core that the one used by the device for OFDM modulation. As described in act 620, this is a significant advantage of the pulse burst transmission method, since transmitting the same number of pulses at regular intervals (rather than in bursts) over the same length of time would require a $N_{bursts}N_{perburst}$ size FFT, which may be infeasibility large given the required radar image SNR.

In addition, while in principle phase noise (particularly on the local oscillator) may degrade the effective sensitivity of each Doppler profile, in fact since the same local oscillator is used for both the transmitter and receiver, the effective phase noise may be significantly attenuated by the so-called "range correlation effect", given by:

$$G_{PNatt}=10\log(4\sin^2(2\pi R f_{offset}/c)) \text{ dB} \qquad (22)$$

where $G_{PNatt}$ is the phase noise attenuation in dB at frequency offset $f_{offset}$. It may be seen that the attenuation is greatest for short range and small frequency offsets. In particular, for WPAN systems where the maximum range is typically 10 m, this gives rise to greater than 85 dB attenuation for offsets up to 100 Hz (equivalent to 0.25 m/s velocity for 60 GHz signals).

For example, a four-dimensional radar image array may be formed by collating Doppler spread arrays $d_i^{(i_{angpos})}$ for azimuth and elevation (jointly referenced by beam position index $i_{angpos}$) and for each range bin i. The relationship between the range bin index i and the range may be given by:

$$R(i)=ic/2B \qquad (23)$$

The relationship between the Doppler index $i_{dopfreq}$ and the radial velocity may be given by:

$$v(i)=2v_{max}i_{dopfreq}/N_{bursts} \qquad (24)$$

where velocities v greater than or equal to $v_{max}$ are interpreted as negative velocities, i.e. $v \rightarrow v-2v_{max}$.

In an act 670, an indication unit 570 allows indicating the detection of the first object to be detected when the second profile matches the first profile.

In an illustrative embodiment of the method according to the invention, the act of indicating may further comprise comparing the attributes of the first and second profile in order to decide of a match between the first and the second profile Once the radar image (i.e. second profile) has been computed (in act 660, it may be determine if the object to be detected has been detected (or not) in the environment. This may be done by comparing the radar image (second profile) to the profile (first profile) of different objects or classes of objects with certain attributes. Those skilled in the art will be aware that various techniques for performing this comparison are known in prior art. For example, if the compared profile corresponds to that of a small object ("point target") with constant velocity (which may be zero), the profile is simply a delta function, and the comparison process resolves to a simple decision that an object exists if the magnitude of an element in the radar image array is above a certain threshold, and that its position (in azimuth, elevation and range) and radial velocity are the values corresponding to that element on each dimension of the array. On the other hand, if the compared profile corresponds to a larger object or an object with more complex movement, the profile may extend across multiple elements in the radar image array. In this case, techniques such as cross-correlation may be used to detect such objects (and so classify them) and estimate their position and movement. In particular, in the case of a large complex object such as a human body, the reflecting surfaces may extend over several range bins. In addition, vibrations of certain portions of the human body due to breathing and/or heart movement will give rise to distinctive profiles in the Doppler dimension (the so-called micro-Doppler effect). In this case, comparison may be used to classify an object as a human by detection of this distinctive profile, which typically takes the form of a set of elements in the array spaced by certain amounts that correspond to the breathing rate and/or heart rate of the human body.

Any solution to indicate the detection may be used such as the display of the first and/or second profiles, or of their comparison or match, any visual or noise indicator, a message, notification etc. . . . . .

The indication may be for example "an object exists at 3.24 m range, 30 deg azimuth, 42 deg elevation, which is a human body" or, when the first profile has been selected for reference as a human and the second profile does not match: "the object is not a human body" etc. . . . . . There may also be several objects detected, e.g. with a decision like "three objects exist at [range/azimuth/elevation positions of each object], the first object is a human body, the second is a moving vehicle, and the third is inanimate" when each of the corresponding first profiles are selected (simultaneously or in turn). When there are multiple objects, the device may estimate their vibration/velocity, and it may be able to indicate, by comparing the first profile of each object with the computed second profile, the detection of a large object from a small object, and using vibration estimation could hopefully tell apart the human from the other objects, and the car, e.g. if it is moving.

In an illustrative embodiment of the method according to the invention, in a preliminary act 500, an emergency motion detection unit 500 allows triggering at least one of the subsequent acts 510 to 570. The trigger may be for example one of those explained here above in reference to the emergency motion detection unit 500 of FIG. 5.

Figure 8:
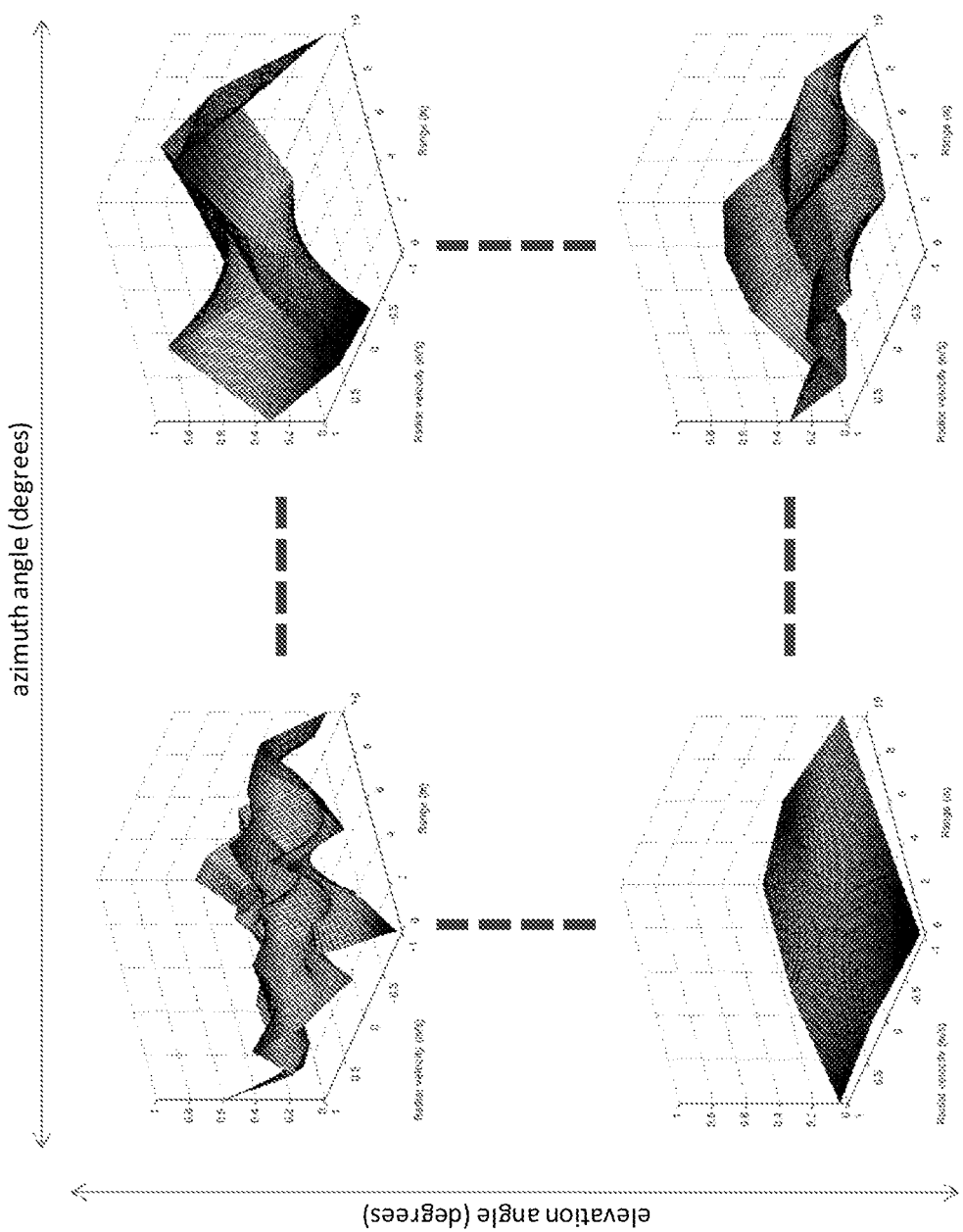
FIG. 8 schematically illustrates radar images of an object in range, velocity, azimuth angle and elevation according to an embodiment of the present invention.

FIG. 8 describes an illustrative embodiment of a computed second profile according to the invention. The process of object detection may produce a four-dimensional array of complex values (the size of the array in certain dimensions may equal one), which represents the radar image of a second object in the local environment. Each element of the array represents the apparent complex reflectivity of the local environment at a given position defined by the azimuth and elevation angles with respect to the device and range (distance) from the device, and corresponding to a given radial velocity with respect to the device. The radar image described on FIG. 8 may be then processed to determine (by comparison with at least one selected first profile) the type of objects detected in the local environment through their attributes—such as e.g. their position, movement characteristics, classification and/or identification . . . .

Although the present disclosure has been described with reference to one or more examples, workers skilled in the art will recognize that changes may be made in form and detail without departing from the scope of the disclosure and/or the appended claims.

The invention claimed is:

1. A method of detecting an object to be detected, said object being associated with a profile, said profile characterizing reflection of a signal on the object, said method comprising, for a device in a telecommunication network, the acts of:

selecting a first profile corresponding to a first object to be detected, requesting by the device, based on the first profile, a resource allocation to the communication network, receiving the resource allocation by the device from the communication network, transmitting a signal from the device in the direction of a second object using said allocated resource, receiving a reflected signal, corresponding to the reflection of the transmitted signal on the second object, computing a second profile using the received reflected signal, and indicating detection of the first object to be detected when the second profile matches the first profile.

2. The method according to claim 1, wherein, in the act of requesting a resource allocation based on the first profile, the resource corresponds to a time slot at a defined time interval, said defined time interval being based on at least one attribute of the first profile.

3. The method according to claim 1, wherein the act of computing the second profile is computed based on the Doppler effect of the received reflected signal on the second object.

4. The method according to claim 1, wherein the first profile comprises attributes characterizing the first object and wherein the second profile comprises attributes characterizing the second object, said attributes comprising at least one attribute of the group consisting of range, azimuth, elevation and velocity.

5. The method according to claim 1, the act of indicating further comprising comparing attributes of the first and second profile in order to decide of a match between the first and the second profile.

6. The method according to any claim 1, said method further comprising an act of obtaining a request for triggering the selection of the first profile.

7. The method according to claim 1, wherein the act of selecting a first profile is performed automatically by the device.

8. The method according to claim 1, wherein the act of indicating further comprises comparing the computed second profile with at least one profile of a set of first profiles, said set of profiles being accessible to the device.

9. The method according to claim 1, wherein the resource allocated for detection is allocated with a high priority among the resources allocated in the communication network.

10. A device for detecting an object to be detected, said object being associated with a profile, said profile characterizing reflection of a signal on the object, said device, in a telecommunication network, comprising:
- a selection unit configured to select a first profile corresponding to a first object to be detected,
- a resource allocation request unit configured to request, based on the first profile, a resource allocation to the communication network,
- a resource allocation reception unit configured to receive the resource allocation from the communication network,
- a signal transmission unit configured to transmit a signal in the direction of a second object using said allocated resource,
- a signal reception unit configured to receive a reflected signal, corresponding to the reflection of the transmitted signal on the second object,
- a computing unit configured to compute a second profile using the received reflected signal, and
- an indication unit indicating configured to indicate detection of the first object to be detected when the second profile matches the first profile.

11. The device according to claim 10, wherein the computing unit is further configured to compute the second profile based on the Doppler effect of the received reflected signal on the second object.

12. The device according to claim 10, wherein the indicating unit is further configured to compare attributes of the first and second profile in order to decide of a match between the first and the second profile.

13. The device according to claim 10, said selection unit being further configured to obtain a request for triggering the selection of the first profile.

14. A system for detecting an object to be detected, said object being associated with a profile, said profile characterizing reflection of a signal on the object, said system comprising:
- a telecommunication network,
- an object to be detected, and
- a device comprising:
  - a selection unit configured to select a first profile corresponding to a first object to be detected,
  - a resource allocation request unit configured to request, based on the first profile, a resource allocation to the communication network,
  - a resource allocation reception unit configured to receive the resource allocation from the communication network,
  - a signal transmission unit configured to transmit a signal in the direction of a second object using said allocated resource,
  - a signal reception unit configured to receive a reflected signal, corresponding to the reflection of the transmitted signal on the second object,
  - a computing unit configured to compute a second profile using the received reflected signal, and
  - an indication unit configured to indicate the detection of the first object to be detected when the second profile matches the first profile.

15. A non-transitory computer-readable medium having computer-executable instructions to configure a computer system to perform a method of detecting an object to be detected, said object being associated with a profile, said profile characterizing reflection of a signal on the object, said instructions comprising, for a device in a telecommunication network:
- instructions that configure the computer system to select a first profile corresponding to a first object to be detected,
- instructions that configure the computer system to request, based on the first profile, a resource allocation to the communication network,
- instructions that configure the computer system to receive the resource allocation from the communication network,
- instructions that configure the computer system to transmit a signal from the device in the direction of a second object using said allocated resource,
- instructions that configure the computer system to receive a reflected signal, corresponding to the reflection of the transmitted signal on the second object,
- instructions that configure the computer system to compute a second profile using the received reflected signal, and
- instructions that configure the computer system to indicate detection of the first object to be detected when the second profile matches the first profile.

* * * * *